United States Patent
Burger et al.

(10) Patent No.: US 10,061,584 B2
(45) Date of Patent: *Aug. 28, 2018

(54) STORE NULLIFICATION IN THE TARGET FIELD

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,404

(22) Filed: Mar. 3, 2016

(65) Prior Publication Data
US 2017/0083328 A1 Mar. 23, 2017

Related U.S. Application Data
(60) Provisional application No. 62/221,003, filed on Sep. 19, 2015.

(51) Int. Cl.
*G06F 9/312* (2018.01)
*G06F 9/44* (2018.01)
(Continued)

(52) U.S. Cl.
CPC .......... *G06F 9/3016* (2013.01); *G06F 9/268* (2013.01); *G06F 9/3004* (2013.01);
(Continued)

(58) Field of Classification Search
CPC .... G06F 11/36; G06F 11/3656; G06F 9/3016; G06F 9/268; G06F 9/30007;
(Continued)

(56) References Cited

U.S. PATENT DOCUMENTS

| | | | |
|---|---|---|---|
| 5,615,350 | A | 3/1997 | Hesson |
| 5,790,822 | A | 8/1998 | Sheaffer et al. |

(Continued)

FOREIGN PATENT DOCUMENTS

WO    WO 2014/193878    12/2014

OTHER PUBLICATIONS

Bouwens et al., "Architecture Enhancements for the ADRES Coarse-Grained Reconfigurable Array," High Performance Embedded Architectures and Compilers, Springer Berlin Heidelberg pp. 66-81 (2008).

(Continued)

*Primary Examiner* — Daniel H Pan
(74) *Attorney, Agent, or Firm* — Klarquist Sparkman, LLP

(57) ABSTRACT

Apparatus and methods are disclosed for nullifying memory store instructions identified in a target field of a nullification instruction. In some examples of the disclosed technology, an apparatus can include memory and one or more block-based processor cores configured to fetch and execute a plurality of instruction blocks. One of the cores can include a control unit configured, based at least in part on receiving a nullification instruction, to obtain an instruction identification for a memory access instruction of a plurality of memory access instructions, based on a target field of the nullification instruction. The memory access instruction associated with the instruction identification is nullified. The memory access instruction is in a first instruction block of the plurality of instruction blocks. Based on the nullified memory access instruction, a subsequent memory access instruction from the first instruction block is executed.

33 Claims, 16 Drawing Sheets

(51) Int. Cl.
| | |
|---|---|
| *G06F 9/30* | (2018.01) |
| *G06F 15/80* | (2006.01) |
| *G06F 9/32* | (2018.01) |
| *G06F 9/38* | (2018.01) |
| *G06F 9/26* | (2006.01) |
| *G06F 11/36* | (2006.01) |
| *G06F 12/0862* | (2016.01) |
| *G06F 9/35* | (2018.01) |
| *G06F 12/1009* | (2016.01) |
| *G06F 13/42* | (2006.01) |
| *G06F 15/78* | (2006.01) |
| *G06F 9/46* | (2006.01) |
| *G06F 9/52* | (2006.01) |
| *G06F 12/0875* | (2016.01) |
| *G06F 12/0811* | (2016.01) |
| *G06F 12/0806* | (2016.01) |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30058* (2013.01); *G06F 9/30072* (2013.01); *G06F 9/30098* (2013.01); *G06F 9/30101* (2013.01); *G06F 9/30105* (2013.01); *G06F 9/30145* (2013.01); *G06F 9/30167* (2013.01); *G06F 9/30189* (2013.01); *G06F 9/32* (2013.01); *G06F 9/35* (2013.01); *G06F 9/3802* (2013.01); *G06F 9/3804* (2013.01); *G06F 9/3822* (2013.01); *G06F 9/3836* (2013.01); *G06F 9/3848* (2013.01); *G06F 9/3855* (2013.01); *G06F 9/3867* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3859* (2013.01); *G06F 12/0806* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/13* (2018.01); *Y02D 10/14* (2018.01); *Y02D 10/151* (2018.01)

(58) Field of Classification Search
CPC ............. G06F 9/30021; G06F 9/30036; G06F 9/3004; G06F 9/30043; G06F 9/3005; G06F 9/30058; G06F 9/30072; G06F 9/3009; G06F 9/30098; G06F 9/30101; G06F 9/30105; G06F 9/30145; G06F 9/30167; G06F 9/30189; G06F 9/32; G06F 9/35; G06F 9/3802; G06F 9/3804; G06F 9/3822; G06F 9/3836; G06F 9/3848; G06F 9/3855; G06F 9/3867; G06F 12/0862; G06F 12/1009; G06F 2212/452; G06F 2212/602; G06F 2212/604; G06F 2212/62; G06F 15/7867; G06F 15/80; G06F 15/8007; G06F 9/3859; G06F 9/466; G06F 9/528; G06F 11/3648; G06F 12/0806; G06F 12/0811; G06F 12/0875; G06F 13/4221; Y02B 60/1225; Y02B 60/1228; Y02B 60/1235; Y02D 10/14; Y02D 10/13; Y02D 10/151

USPC ......... 712/216–219, 226, 235, 236; 717/122, 717/136, 140, 153
See application file for complete search history.

(56) References Cited

U.S. PATENT DOCUMENTS

| | | |
|---|---|---|
| 5,796,997 A | 8/1998 | Lesartre et al. |
| 5,799,167 A | 8/1998 | Lesartre |
| 5,845,103 A | 12/1998 | Sodani et al. |
| 5,943,501 A | 8/1999 | Burger et al. |
| 6,016,399 A | 1/2000 | Chang |
| 6,061,776 A | 5/2000 | Burger et al. |
| 6,115,808 A | 9/2000 | Arora |
| 6,161,170 A | 12/2000 | Burger et al. |
| 6,164,841 A | 12/2000 | Mattson et al. |
| 6,493,820 B2 | 12/2002 | Akkary et al. |
| 6,529,922 B1 | 3/2003 | Hoge |
| 6,813,705 B2* | 11/2004 | Duesterwald ....... G06F 9/30043 712/216 |
| 6,918,032 B1 | 7/2005 | Abdallah et al. |
| 6,965,969 B2 | 11/2005 | Burger et al. |
| 6,988,183 B1 | 1/2006 | Wong |
| 7,032,217 B2 | 4/2006 | Wu |
| 7,299,458 B2 | 11/2007 | Hammes |
| 7,380,038 B2 | 5/2008 | Gray |
| 7,571,284 B1 | 8/2009 | Olson |
| 7,676,650 B2 | 3/2010 | Ukai |
| 7,853,777 B2 | 12/2010 | Jones et al. |
| 7,877,580 B2 | 1/2011 | Eickemeyer et al. |
| 7,917,733 B2 | 3/2011 | Kazuma |
| 8,055,881 B2 | 11/2011 | Burger et al. |
| 8,055,885 B2 | 11/2011 | Nakashima |
| 8,127,119 B2 | 2/2012 | Burger et al. |
| 8,180,997 B2 | 5/2012 | Burger et al. |
| 8,201,024 B2 | 6/2012 | Burger et al. |
| 8,250,555 B1 | 8/2012 | Lee et al. |
| 8,321,850 B2 | 11/2012 | Bruening et al. |
| 8,332,452 B2 | 12/2012 | Mejdrich et al. |
| 8,433,885 B2 | 4/2013 | Burger et al. |
| 8,447,911 B2 | 5/2013 | Burger et al. |
| 8,464,002 B2 | 6/2013 | Burger et al. |
| 8,817,793 B2 | 8/2014 | Mushano |
| 9,021,241 B2 | 4/2015 | Burger et al. |
| 9,043,769 B2 | 5/2015 | Vorbach |
| 9,053,292 B2 | 6/2015 | Abdallah |
| 2001/0032306 A1 | 10/2001 | Duesterwald et al. |
| 2002/0083313 A1 | 6/2002 | De Oliveira Kastrup Pereira et al. |
| 2003/0028755 A1 | 2/2003 | Ohsawa |
| 2007/0223629 A1 | 9/2007 | Zeng et al. |
| 2008/0168233 A1* | 7/2008 | Luc ..................... G06F 12/0804 711/133 |
| 2009/0013135 A1 | 1/2009 | Burger et al. |
| 2009/0013160 A1 | 1/2009 | Burger et al. |
| 2010/0146209 A1 | 6/2010 | Burger et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2012/0303933 A1 | 11/2012 | Manet et al. |
| 2012/0311306 A1 | 12/2012 | Mushano |
| 2013/0024725 A1* | 1/2013 | Cremer ............... G06F 9/30076 714/15 |
| 2013/0159674 A1 | 6/2013 | Muff et al. |
| 2013/0198499 A1 | 8/2013 | Dice et al. |
| 2013/0254486 A1* | 9/2013 | McCormick, Jr. .. G06F 12/0875 711/122 |
| 2013/0326200 A1 | 12/2013 | Kleen et al. |
| 2014/0108862 A1* | 4/2014 | Rafacz ................. G06F 9/3826 714/15 |
| 2014/0181475 A1 | 6/2014 | Abdallah |
| 2014/0195787 A1 | 7/2014 | Scalabrino et al. |
| 2014/0281404 A1 | 9/2014 | Iyengar et al. |
| 2014/0372736 A1 | 12/2014 | Greenhalgh |
| 2015/0067662 A1 | 3/2015 | Palalau |
| 2015/0089188 A1 | 3/2015 | Gonion et al. |

(56) References Cited

U.S. PATENT DOCUMENTS

| | | | |
|---|---|---|---|
| 2015/0089191 A1 | 3/2015 | Gonion et al. | |
| 2015/0100757 A1 | 4/2015 | Burger et al. | |
| 2015/0127928 A1 | 5/2015 | Burger et al. | |
| 2015/0199199 A1 | 7/2015 | Burger et al. | |
| 2015/0199272 A1 | 7/2015 | Goel et al. | |
| 2017/0083324 A1* | 3/2017 | Burger | G06F 9/3004 |
| 2017/0083325 A1 | 3/2017 | Burger et al. | |
| 2017/0083329 A1* | 3/2017 | Burger | G06F 9/3004 |
| 2017/0083330 A1* | 3/2017 | Burger | G06F 9/3004 |
| 2017/0083331 A1 | 3/2017 | Burger et al. | |

OTHER PUBLICATIONS

Burger et al., "Design and Implementation of the TRIPS EDGE Architecture", In Proceedings of the 32nd Annual International Symposium on Computer Architecture, Jun. 4, 2005, pp. 1-41.

Burger, et al., "Scaling to the End of Silicon with EDGE Architectures", In Journal of Computer, vol. 37 Issue 7, Jul. 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

"Explicit Data Graph Execution", Retrieved on: Jul. 13, 2015, Available at: https://en.wikipedia.org/wiki/Explicit_Data_Graph_Execution.

Fallin, et al., "The Heterogeneous Block Architecture", In Proceedings of 32nd IEEE International Conference on Computer Design, Oct. 19, 2014, pp. 1-8.

Gebhart et al., "An Evaluation of the TRIPS Computer System," In Proceedings of the 14th international conference on Architectural support for programming languages and operating systems, Mar. 7, 2009, 12 pages.

Govindan, "E3:Energy-Efficient EDGE Architectures", In Dissertation, Aug. 2010, 244 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gray and Smith, "Towards an Area-Efficient Implementation of a High ILP EDGE Soft Processor: Comparing Out-of-Order Dataflow Instruction Scheduler Designs," poster temporarily on display during The 22nd IEEE International Symposium on Field-Programmable Custom Computing Machines, May 11-13, 2014, Boston, Massachusetts (poster on display for approximately 1-2 hours, and less than one day, May 2014).

Gulati et al., "Multitasking Workload Scheduling on Flexible Core Chip Multiprocessors," In Proceedings of the Computer Architecture News, vol. 36, Issue 2, May 2008, 10 pages.

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Huang et al., "Compiler-Assisted Sub-Block Reuse," Retrieved on: Apr. 9, 2015; available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).

Huang, "Improving Processor Performance Through Compiler-Assisted Block Reuse," In Doctoral Dissertation, May 2000, 125 pages.

Keckler et al., "Tera-Op Reliable Intelligently Adaptive Processing System (Trips)," In AFRL-IF-WP-TR-2004-1514, document dated Apr. 2004, 29 Pages.

Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).

Kozumplik, et al., "TRIPS to the Semantic EDGE", Published on: Sep. 21, 2015, Available at: http://vbn.aau.dk/ws/files/61072300/1212050422.pdf.

Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).

Li et al., "Hybrid Operand Communication for Dataflow Processors," document not dated, 10 pages (also published as Li et al., "Hybrid operand communication for dataflow processors," In Workshop on Parallel Execution of Sequential Programs on Multi-core Architectures, pp. 61-71 (2009)).

Maher, "Atomic Block Formation for Explicit Data Graph Execution Architectures", In Dissertation of Doctor of Philosophy, Aug. 2010, 185 pages.

Maher et al., "Merging Head and Tail Duplication for Convergent Hyperblock Formation," In Annual IEEE/ACM International Symposium on Microarchitecture, Dec. 2006, 12 pages.

McDonald, et al., "TRIPS Processor Reference Manual" In Technical Report TR-05-19, Mar. 10, 2005, pp. 1-194.

Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).

Melvin et al., "Enhancing Instruction Scheduling with a Block-Structured ISA," International Journal of Parallel Programming, vol. 23, No. 3, Jun. 1995, 23 pages.

Microsoft Research, "E2," document downloaded on Apr. 10, 2015 from http://research.microsoft.com/en-us/projects/e2/.

Nagarajan et al., "Critical Path Analysis of the TRIPS Architecture," In IEEE International Symposium on Performance Analysis of Systems and Software, Mar. 19, 2006, 11 pages.

Nagarajan et al., "A Design Space Evaluation of Grid Processor Architectures," In Proceedings of the 34th annual ACM/IEEE international symposium on Microarchitecture, Dec. 1, 2001, pp. 40-51.

Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.

Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.

Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).

Robatmili et al., "Exploiting Criticality to Reduce Bottlenecks in Distributed Uniprocessors," 17th IEEE International Symposium on High-Perfonnance Computer Architecture (HPCA-17), Feb. 2011, 12 pages.

Robatmili et al., "How to Implement Effective Prediction and Forwarding for Fusable Dynamic Multicore Architectures," In Pro-

(56) References Cited

OTHER PUBLICATIONS ceedings of the 19th IEEE International Symposium on High-Performance Computer Architecture, Feb. 23, 2013, 12 pages.
Roesner, "Counting Dependence Predictors," In Undergraduate Honors Thesis, May 2, 2008, 25 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sankaralingam, Karthikeyan, "Polymorphous Architectures: A Unified Approach for Extracting Concurrency of Different Granularities", In Dissertation of the University of Texas, Aug. 2007, 276 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Sibi et al., "Scaling Power and Performance via Processor Composability," University of Texas at Austin technical report No. TR-10-14 (2010), 20 pages.
Smith, et al., "Compiling for EDGE Architectures", In Proceedings of 4th International Symposium on Code Generation and Optimization, Mar. 26, 2006, pp. 1-11.
Smith, et al., "Dataflow Predication", In Proceedings of 39th Annual IEEE/ACM International Symposium on Microarchitecture, Dec. 9, 2006, 12 pages.
Smith, Aaron Lee, "Explicit Data Graph Compilation", In Dissertation of The University of Texas, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Tamches et al., "Dynamic Kernel Code Optimization," In Workshop on Binary Translation, 2001, 10 pages.
Wu, et al., "Block Based Fetch Engine for Superscalar Processors", In Proceedings of 15th International Conference on Computer Applications in Industry and Engineering, Nov. 7, 2002, 4 pages.
International Search Report and Written Opinion for PCT/US2016/051402, dated Dec. 22, 2016, 17 pages.
PCT Chapter II Demand for International Preliminary Examination and amended claims under Article 34 submitted to the European Patent Office dated May 23, 2017, for PCT/US2016/051402, 9 pages.
Abraham, et al., "Predictability of Load/Store Instruction Latencies", In Proceedings of the 26th annual international symposium on Microarchitecture, Dec. 1, 1993, pp. 139-152.
Chrysos et al., "Memory Dependence Prediction using Store Sets", In Proceedings of the 25th Annual International Symposium on Computer Architecture, Jun. 1998, pp. 142-153.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
"How Many Clock Cycles does a RISC/CISC Instruction Take to Execute?", Retrieved on: Aug. 24, 2015, Available at: http://electronics.stackexchange.com/questions/170551/how-many-clock-cycles-does-a-risc-cisc-instruction-take-to-execute.
Ipek et al., "Core Fusion: Accommodating Software Diversity in Chip Multiprocessors", In Proceedings of the 34th annual international symposium on Computer architecture, Jun. 9, 2007, 12 pages.
Kane, "PA-RISC 2.0 Architecture", In Publication of Prentice Hall PTR, Retrieved on: Sep. 17, 2015, 28 pages.
Kavi, et al., "Concurrency, Synchronization, Speculation—the Dataflow Way", In Journal of Advances in Computers, vol. 96, Nov. 23, 2013, pp. 1-41.
Liu, "Hardware Techniques to Improve Cache Efficiency", In Dissertation of the University of Texas at Austin, May 2009, 189 pages.
McDonald et al., "Characterization of TCC on Chip-Multiprocessors," Parallel Architectures and Compilation Techniques, 2005. PACT 2005. 14th International Conference on. IEEE, 2005, 12 pages.
"Microarchitecture", Retrieved on: Aug. 24, 2015, Available at: https://github.com/jbush001/NyuziProcessor/wiki/Microarchitecture.
Munshi, et al., "A Parameterizable SIMD Stream Processor", In Proceedings of Canadian Conference on Electrical and Computer Engineering, May 1, 2005, pp. 806-811.
Park, et al., "Reducing Design Complexity of the Load/Store Queue", In Proceedings of the 36th annual IEEE/ACM International Symposium on Microarchitecture, Dec. 3, 2003, 12 pages.
Pengfei et al., "M5 Based EDGE Architecture Modeling", In Proceedings of IEEE International Conference on Computer Design, Oct. 3, 2010, pp. 289-296.
Pericas et al., "A Two-Level Load/Store Queue Based on Execution Locality" "In Proceedings of 35th International Symposium on Computer Architecture", Jun. 21, 2008, 12 pages.
Pierce et al., "Wrong-Path Instruction Prefetching", In Proceedings of the 29th Annual IEEE/ACM International Symposium on Microarchitecture, Dec. 2, 1996, pp. 1-17.
Rahman, Reza, "Intel® Xeon Phi™ Core Micro-Architecture", Published on: Aug. 29, 2014, Available at: https://software.intel.com/en-us/articles/intel-xeon-phi-core-micro-architecture.
Sethumadhavan, et al. "Late-Binding: Enabling Unordered Load-Store Queues", In Proceedings of the 34th Annual International Symposium on Computer Architecture, Jun. 9, 2007, pp. 347-357.
Souza et al., "Dynamically Scheduling VLIW Instructions", In Journal of Parallel and Distributed Computing, vol. 60, Jul. 2000, pp. 1480-1511.
Valentine, "Introducing Sandy Bridge", Retrieved on: Aug. 24, 2015, Available at: https://cesga.es/es/paginas/descargaDocumento/id/135.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
International Preliminary Report on Patentability for PCT/US2016/051402, dated Dec. 18, 2017, 20 pages.
Written Opinion of the International Preliminary Examining Authority for PCT/US2016/051402, dated Aug. 29, 2017, 11 pages.

* cited by examiner

FIG. 5
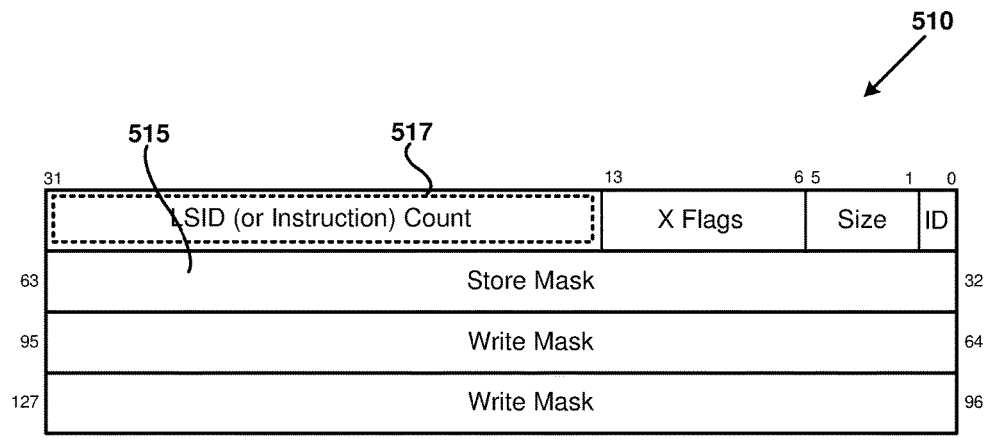
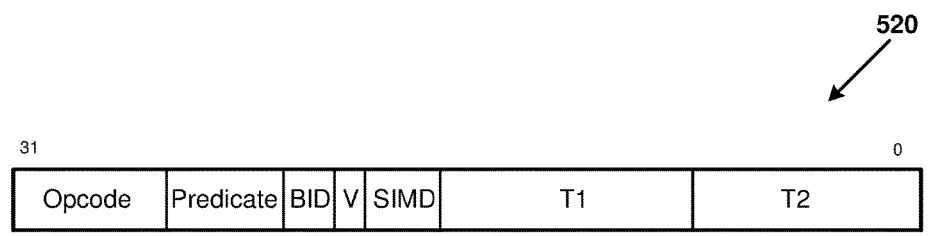
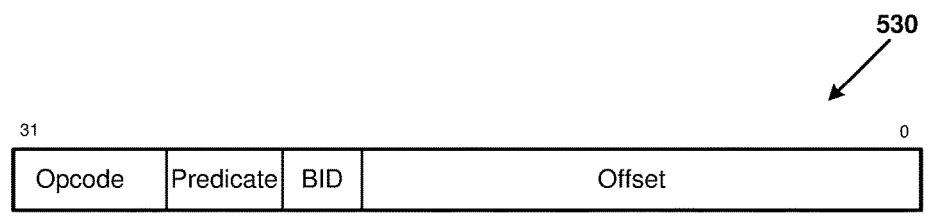
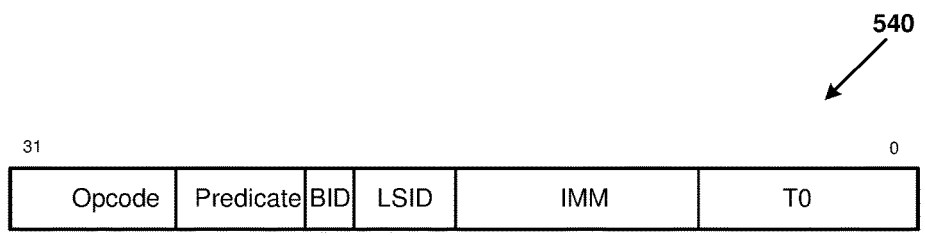

| SHIFT | LSID MASK | LSID TO NULLIFY |
|---|---|---|
| 0 | 0 0 0 0 0 0 0 0 0 0 0 0 0 0 1 1  (902) | [ 0 ]   [ 1 ] |
| 0 | 0 1 1 0 0 0 0 0 0 0 0 0 0 1 1 1  (904) | [ 0 ] [ 1 ] [ 2 ] [ 1 3 ] [ 1 4 ] |
| 1 | 0 1 1 0 0 0 0 0 0 0 0 0 0 0 0 0  (906) | [ 2 9 ] [ 3 0 ] |

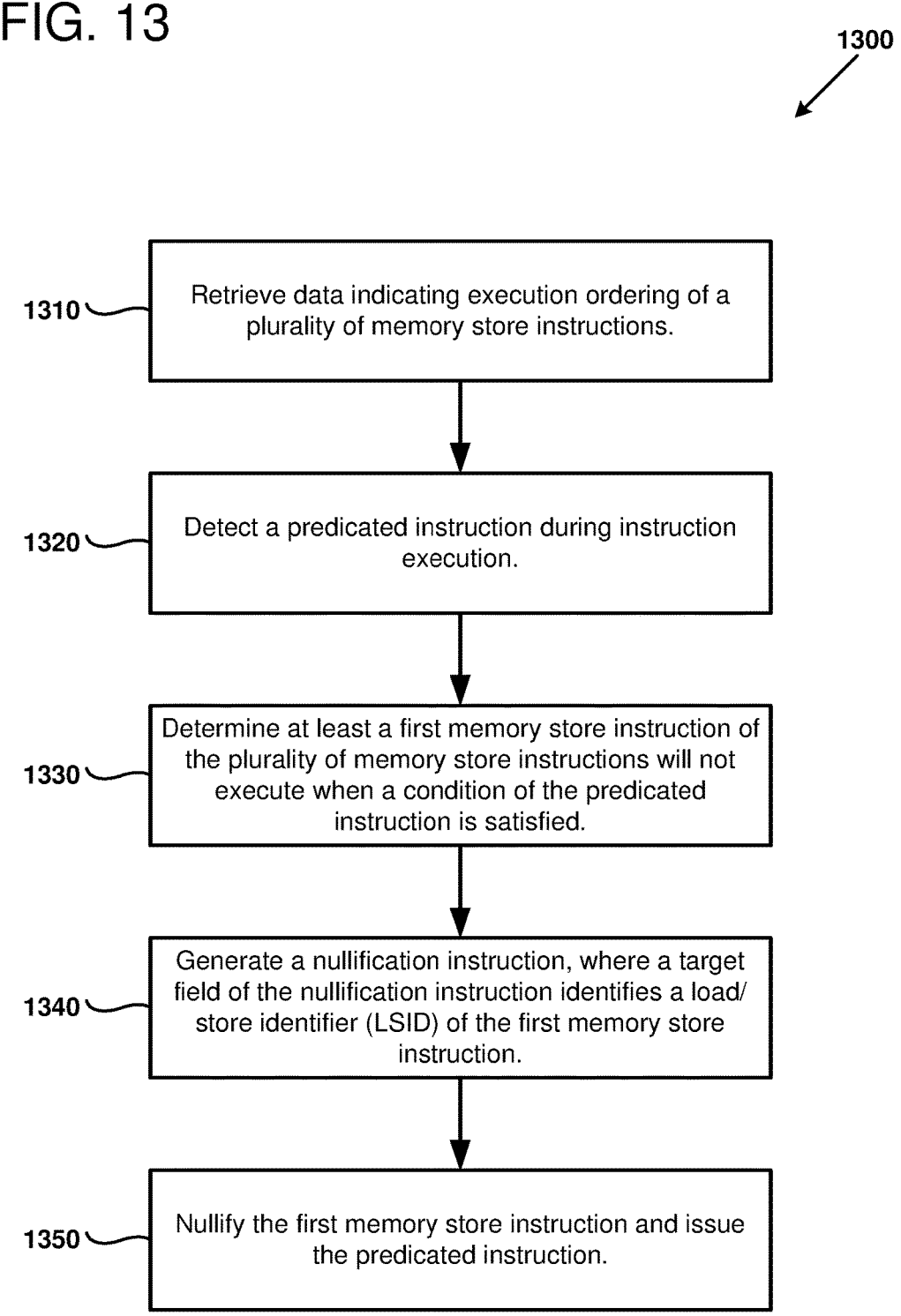

1300

1310 — Retrieve data indicating execution ordering of a plurality of memory store instructions.

1320 — Detect a predicated instruction during instruction execution.

1330 — Determine at least a first memory store instruction of the plurality of memory store instructions will not execute when a condition of the predicated instruction is satisfied.

1340 — Generate a nullification instruction, where a target field of the nullification instruction identifies a load/store identifier (LSID) of the first memory store instruction.

1350 — Nullify the first memory store instruction and issue the predicated instruction.

STORE NULLIFICATION IN THE TARGET FIELD

CROSS-REFERENCE TO RELATED APPLICATIONS

This application claims the benefit of U.S. Provisional Patent Application No. 62/221,003, entitled "BLOCK-BASED PROCESSORS," filed Sep. 19, 2015, which application is incorporated herein by reference in its entirety.

BACKGROUND

Microprocessors have benefitted from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based processor architectures (BB-ISAs), including explicit data graph execution (EDGE) architectures. The described techniques and tools for solutions for, e.g., improving processor performance and/or reducing energy consumption can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

In one example of the disclosed technology, a block-based processor is configured to execute at least one predicated instruction within an instruction block based on a hardware structure storing data indicating the relative ordering of the memory access instructions and/or a total number of memory access instructions (e.g., memory store instructions) that will execute when a condition associated with a predicated instruction is satisfied (or not satisfied). The ordering of memory access instructions can be indicated by load/store identifiers (LSIDs). An instruction block can be committed (i.e., it completes and a subsequent block can be executed) once the block produces all of its outputs (i.e., register writes, memory stores and at least one branch instruction). In reference to the predicated instruction in the instruction block, memory store instructions can be located in both predicated execution paths of the predicated instruction. However, since only one of the predicated execution paths will be executed (based on whether the instruction condition is satisfied or not), memory access instructions (e.g., memory store instructions) that are in the non-executing predicated path have to be nullified in the currently executing predicated path in order to account for all memory access instructions and commit the predicated instruction.

In some examples, the compiler can generate at least one nullification instruction, which can be used to nullify a memory access instruction appearing in a non-executing predicated path of a predicated instruction. More specifically, a nullification instruction can specify an LSID of a memory access instruction (e.g., memory store instruction) in the target field. The LSID in the target field of the nullification instruction can be used to nullify the corresponding memory access instruction, as if the memory access instruction has been executed. In some examples, the nullification instruction can include a shift bit and an LSID mask in its target field, so that a range of LSIDs can be covered by using the shift bit and the LSID mask (e.g., the same LSID mask can designate different LSIDs based on the shift bit). In some examples, the nullification instruction can include two target fields, each target field designating an LSID of a memory access instruction that has to be nullified. In some examples, instead of generating a nullification instruction, a block-based processor can detect the memory access instructions appearing in a non-executing arm of a predicated instruction, and can proceed with executing the remaining arm of the predicated instruction as if the memory access instructions in the non-executing arm have executed. In some examples, the processor can use a counter (e.g., a total count of memory access instructions), and memory access instructions can be nullified by incrementing the counter (and committing the instruction block upon the counter reaching the total number of memory access instructions for the instruction block).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 5 illustrates block-based processor headers and instructions, as can be used in some examples of the disclosed technology.

FIGS. 12-13 are flowcharts outlining example methods of nullifying memory access instructions, as can be used in certain examples of the disclosed technology.

DETAILED DESCRIPTION

I. General Considerations

Figure 1:
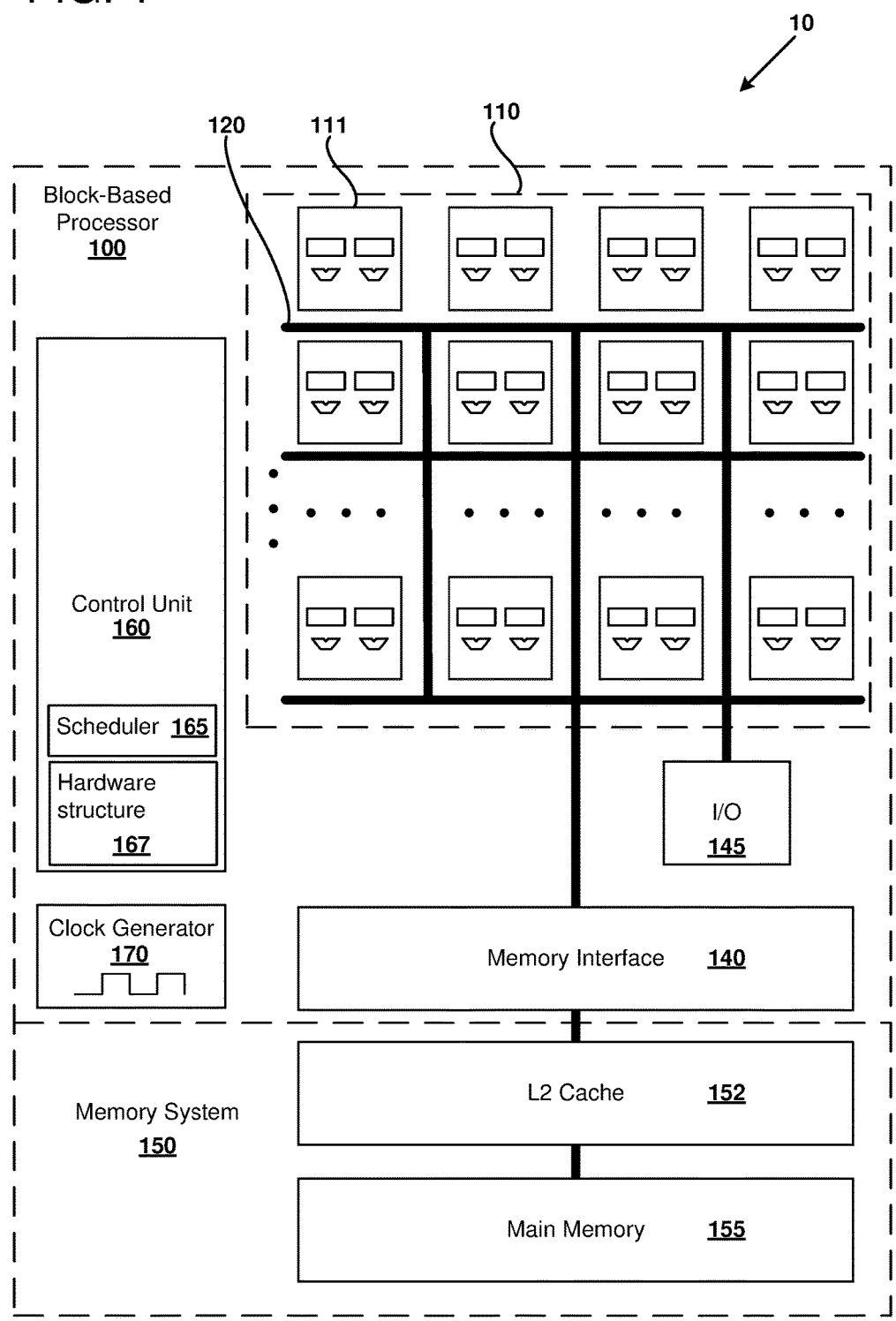
FIG. 1 illustrates a block-based processor core, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and sub-combinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

Apparatus, methods, and computer-readable storage media are disclosed for generation and use of memory access instruction order encodings for block-based processors. In certain examples of the disclosed technology, instruction blocks include an instruction block header and a plurality of instructions. In other words, the executed instructions of the instruction block affect the state, or do not affect the state as a unit.

In some examples of the disclosed technology, a hardware structure stores data indicating an execution order to be adhered to for a number of memory access instructions, including memory load and memory store instructions. A control unit coupled to a processor core controls issuance of memory access instructions based at least in part on data stored in the hardware structure. Thus, memory read/write hazards can be avoided, while allowing for instructions in an instruction block to execute as soon as their dependencies are available. In some examples, the control unit includes wakeup and selection logic used to determine when memory instructions issue to a load/store queue.

As will be readily understood to one of ordinary skill in the relevant art, a spectrum of implementations of the disclosed technology are possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. An external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can generate and control the processor according to control flow and metadata information representing exit points and control flow probabilities for instruction blocks.

The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 165 that is used to allocate instruction blocks to the processor cores 110. As used herein, scheduler allocation refers to directing operation of an instruction blocks, including initiating instruction block mapping, fetching, decoding, execution, committing, aborting, idling, and refreshing an instruction block. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler 165 schedules the flow of instructions including allocation and de-allocation of cores for performing instruction processing, control of input data and output data between any of the cores, register files, the memory interface 140, and/or the I/O interface 145. The control unit 160 also includes memory access instruction hardware structure 167, which can be used to store data including a store mask and a store vector register, as discussed in further detail below.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
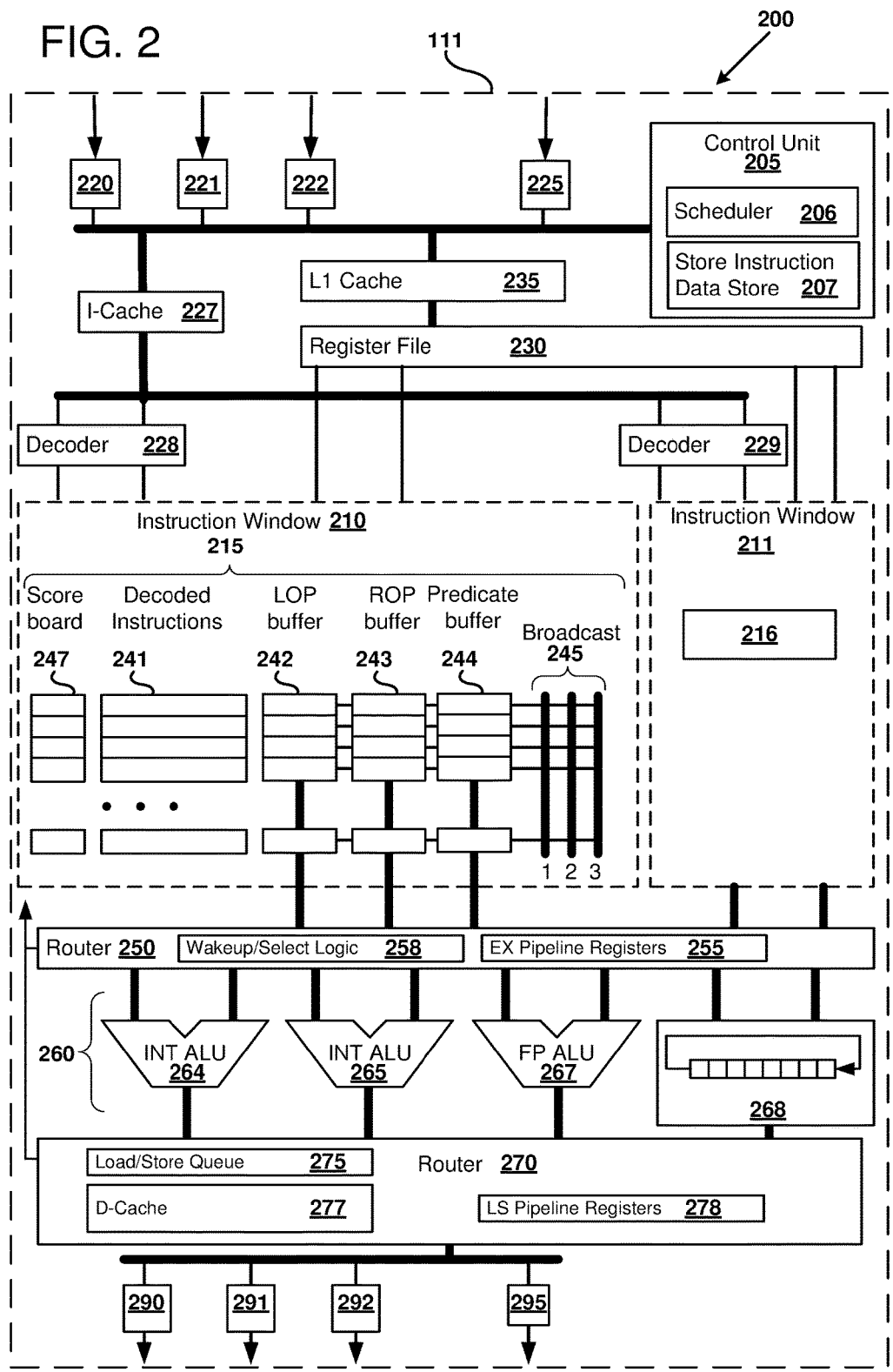
FIG. 2 illustrates a block-based processor core, as can be used in some examples of the disclosed technology.

FIG. 2 is a block diagram further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include generating and using generating and using memory access instruction encodings, allocation and de-allocation of cores for performing instruction processing, control of input data and output data between any of the cores, register files, the memory interface 140, and/or the I/O interface 145. The control unit can also control the load-store queue, scheduler, global control unit, other units, or a combination of these units used to determine the rate and order of instruction issue.

In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

The control unit 205 further includes memory (e.g., in an SRAM or register) for storing control flow information and metadata. For example, data for memory access instruction order can be stored in a hardware structure such as a store instruction data store 207. The store instruction data store 207 can store data for a store mask (e.g., generated by copying data encoded in an instruction block or by an instruction decoder when decoding instructions). The store mask can include one or more load/store identifiers (LSIDs), which can indicate ordering for memory access instructions (loads and stores) associated with an instruction block. In some examples, the store instruction data store 207 includes a counter that tracks the number and type of memory access instructions that have executed. In other examples, the store instruction data store 207 can store a total number of memory access instructions (e.g., memory store instructions) for one or more instruction blocks.

The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211. Further, each of the decoders 228 and 229 can send data to the control unit 205, for example, to configure operation of the processor core 111 according to execution flags specified in an instruction block header or in an instruction.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers can be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associate with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, a predicate buffer 244, three broadcast channels 245, and an instruction scoreboard 247. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values)

until their respective decoded instructions are ready to execute. Instruction operands and predicates are read from the operand buffers 242 and 243 and predicate buffer 244, respectively, not the register file. The instruction scoreboard 247 can include a buffer for predicates directed to an instruction, including wire-OR logic for combining predicates sent to an instruction by multiple instructions.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand(s) using the scoreboard 247. When all of the input operands and predicate(s) for a particular decoded instruction are ready, the instruction is ready to issue. The control unit 205 then initiates execution of (issues) one or more next instruction(s) (e.g., the lowest numbered ready instruction) each cycle, and control signals based on the decoded instruction and the instruction's input operands are sent to one or more of functional units 260 for execution. The decoded instruction can also encodes a number of ready events. The scheduler in the control unit 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and ready instructions can be scheduled in a first-in first-out (FIFO) order from the ready queue. For instructions encoded with load store identifiers (LSIDs), the execution order will also follow the priorities enumerated in the instruction LSIDs, or by executed in an order that appears as if the instructions were executed in the specified order.

Information stored in the scoreboard 245 can include, but is not limited to, the associated instruction's execution predicate(s) (such as whether the instruction is waiting for a predicate bit to be calculated and whether the instruction executes if the predicate bit is true or false), availability of operands to the instruction, or other prerequisites required before issuing and executing the associated individual instruction. The number of instructions that are stored in each instruction window generally corresponds to the number of instructions within an instruction block. In some examples, operands and/or predicates are received on one or more broadcast channels that allow sending the same operand or predicate to a larger number of instructions. In some examples, the number of instructions within an instruction block can be 32, 64, 128, 1024, or another number of instructions. In some examples of the disclosed technology, an instruction block is allocated across multiple instruction windows within a processor core. Out-of-order operation and memory access can be controlled according to data specifying one or more modes of operation.

In some examples, restrictions are imposed on the processor (e.g., according to an architectural definition, or by a programmable configuration of the processor) to disable execution of instructions out of the sequential order in which the instructions are arranged in an instruction block. In some examples, the lowest-numbered instruction available is configured to be the next instruction to execute. In some examples, control logic traverses the instructions in the instruction block and executes the next instruction that is ready to execute. In some examples, only one instruction can issue and/or execute at a time. In some examples, the instructions within an instruction block issue and execute in a deterministic order (e.g., the sequential order in which the instructions are arranged in the block). In some examples, the restrictions on instruction ordering can be configured when using a software debugger to by a user debugging a program executing on a block-based processor.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. The first router 250 further includes wakeup/select logic 258, which is used to determine when memory instructions are sent to a load/store queue 275. For example, the wakeup/select logic 258 can determine if all source operands and predicate conditionals are available for a memory access instruction and based on the determination, send the address (and data, if applicable) to the load/store queue 275.

Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include the load/store queue 275, which can be used to issue memory instructions, a data cache 277, which stores data being input to or output from the core to memory, and load/store pipeline register 278.

The load/store queue 275 receives and temporarily stores information for performing memory access instructions (e.g., memory store and memory load instructions). The instruction block can execute all the memory access instructions as a single, atomic transactional block. In other words, either all or none of the memory access instructions are performed. The relative order in which memory access instructions is determined based on LSIDs associated with each memory access instruction (e.g., an LSID encoded with the corresponding instruction) and in some cases, the store mask. In some examples, additional performance can be obtained by executing the memory access instructions out of the LSID-specified relative ordering, but the state of memory must still appear as if the instructions were executed in order. The load/store queue 275 also receives addresses for load instructions, and addresses and data for store instructions. In some examples, the load/store queue waits to perform the queued memory access instructions until it is determined that the containing instruction block will actually commit. In other examples, the load/store queue 275 can issue at least some memory access instructions speculatively, but will need to flush the memory operations in the event the block does not commit. In other examples, the control unit 205 determines the order in which memory access instructions are executed, by providing functionalities described as being performed by the wakeup/select logic and/or load/store queue 275. In some examples, the processor 100 includes a debug mode that allows for step-by-step issuance of memory access instructions with the aid of a debugger. The load/store queue 275 can be implemented using control logic (e.g., with a finite state machine) and memory (e.g., registers or SRAM) to execute the memory transactions and store memory instruction operands, respectively.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control unit 205 of the processor cores 110. The area, clock period, capabilities, and limitations substantially determine the realized performance of the individual cores 110 and the throughput of the block-based processor 100.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the scheduler 206 accepts events for target instructions that have not yet been decoded and must also inhibit reissue of issued ready instructions. In some examples, instructions can be non-predicated, or predicated (based on a true or false condition). A predicated instruction does not become ready until it is targeted by another instruction's predicate result, and that result matches the predicate condition. If the associated predicate condition does not match, the instruction never issues. In some examples, predicated instructions may be issued and executed speculatively. In some examples, a processor can subsequently check that speculatively issued and executed instructions were correctly speculated. In some examples a misspeculated issued instruction and the specific transitive closure of instructions in the block that consume its outputs can be re-executed, or misspeculated side effects annulled. In some examples, discovery of a misspeculated instruction leads to the complete roll back and re-execution of an entire block of instructions. In some examples, the scheduler performs some or all of the operations described as being performed by the wakeup/selection logic and/or load/store queue discussed above.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
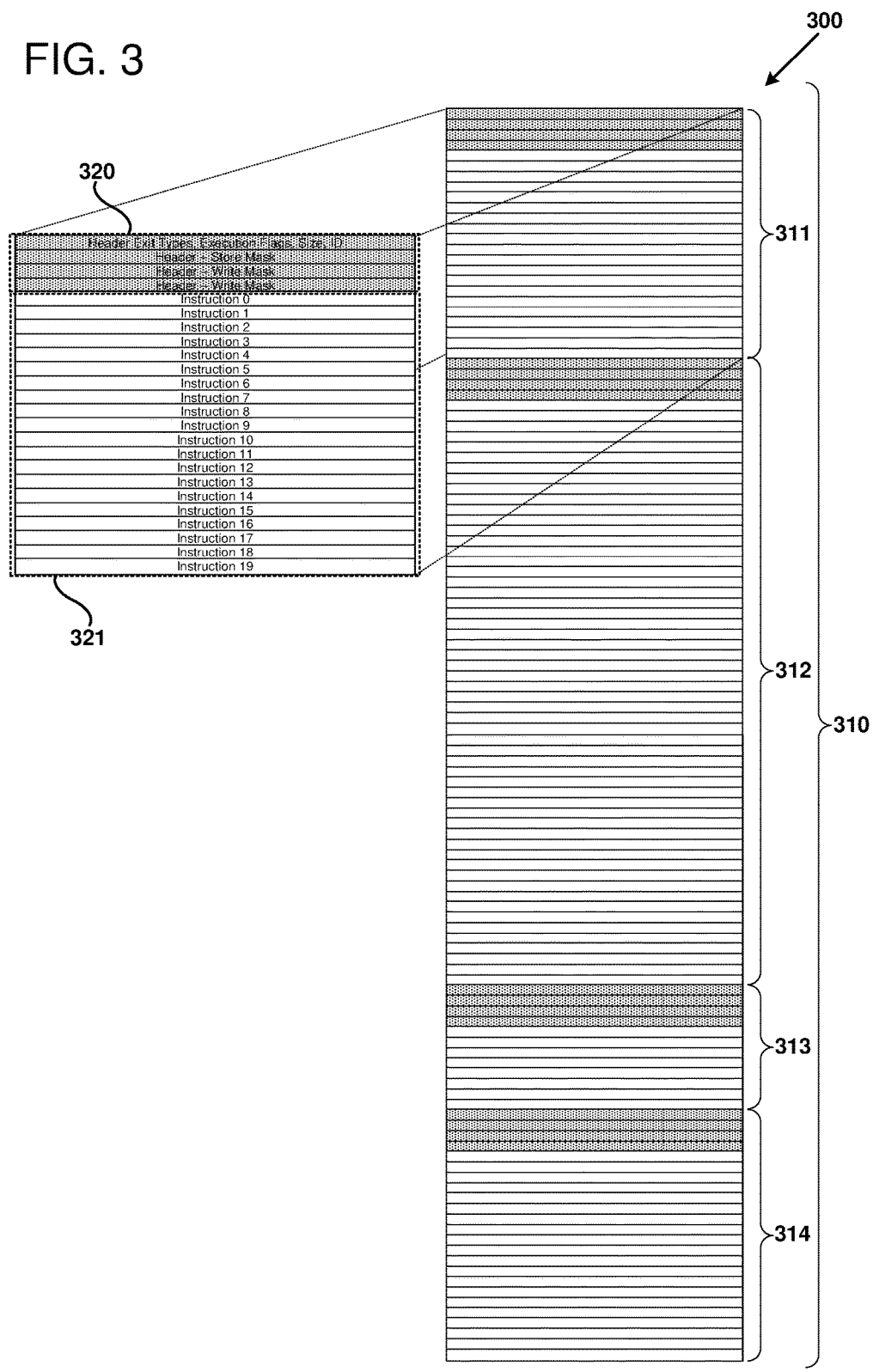
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated. The stream of instructions can be used to implement user application, system services, or any other suitable use. The stream of instructions can be stored in memory, received from another process in memory, received over a network connection, or stored or received in any other suitable manner. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include one or more execution flags that indicate one or more modes of operation for executing the instruction block. For example, the modes of operation can include core fusion operation, vector mode operation, memory dependence prediction, and/or in-order or deterministic instruction execution.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 320 also includes a store mask that indicates which of the load-store queue identifiers encoded in the block instructions are assigned to store operations. For example, for a block with eight memory access instructions, a store mask 01011011 would indicate that there are three memory store instructions (bits 0, corresponding to LSIDs 0, 2, and 5) and five memory load instructions (bits 1, corresponding to LSIDs 1, 3, 4, 6, and 7). The instruction block header can also include a write mask, which identifies which global register(s) the associated instruction block will write.

Figure 7:
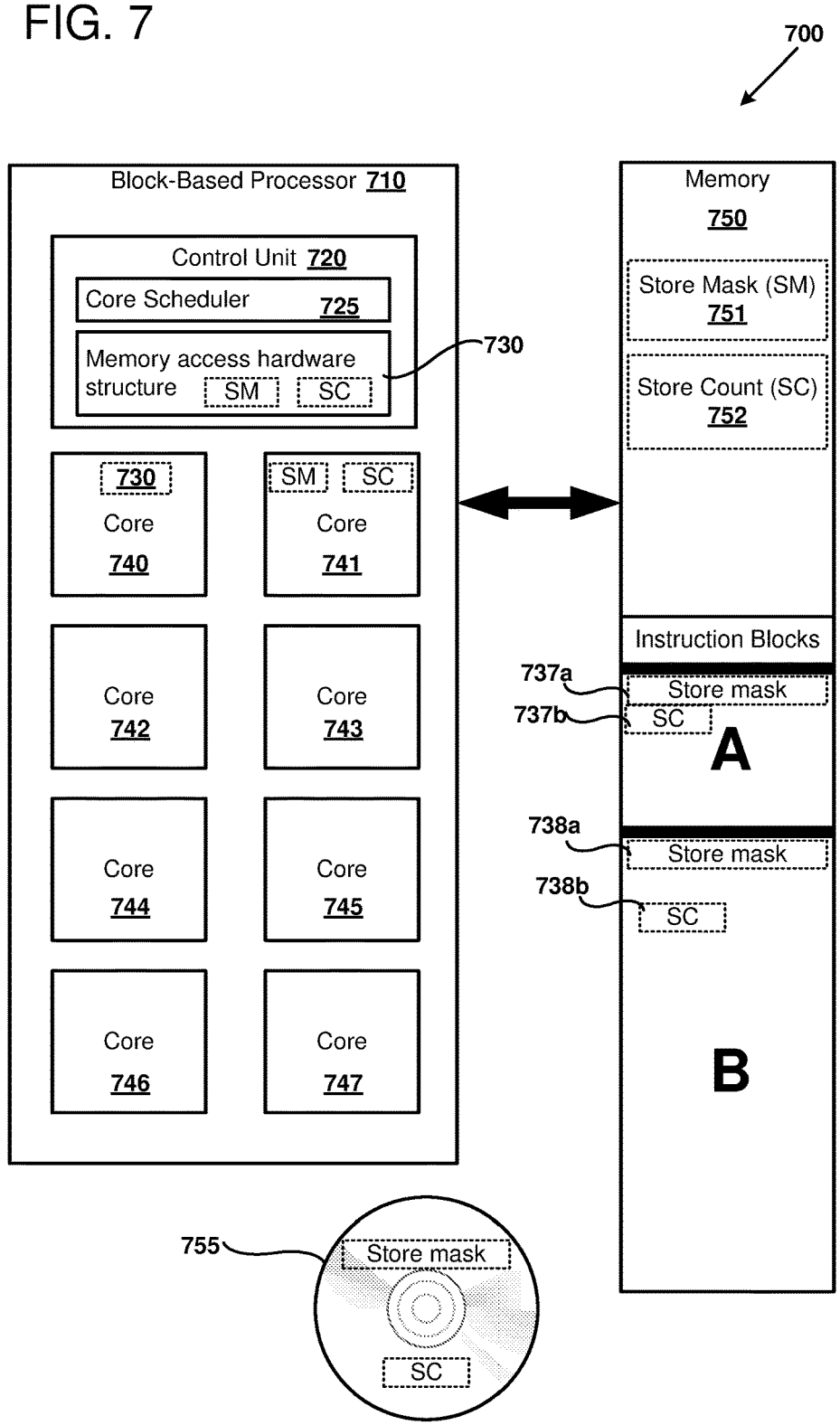
FIG. 7 illustrates a number of instructions blocks and processor cores, as can be used in some examples of the disclosed technology.

In some examples, the store mask is stored in a store vector register by, for example, an instruction decoder (e.g., decoder 228 or 229). In other examples, the instruction block header 320 does not include the store mask, but the store mask is generated dynamically by the instruction decoder by analyzing instruction dependencies when the instruction block is decoded. For example, the decoder can analyze load store identifiers of instruction block instructions to determine a store mask and store the store mask data in a store vector register. Similarly, in other examples, the write mask is not encoded in the instruction block header, but is generated dynamically (e.g., by analyzing registers referenced by instructions in the instruction block) by an instruction decoder) and stored in a write mask register. The store mask and the write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction. In some examples, the block header 320 can also include an instruction count for one or more instruction types within an instruction block (e.g., memory access instructions or memory store instructions count), as illustrated in FIG. 7.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative execution based on control flow and data regarding memory access instructions stored in a hardware structure, such as a store instruction data store 207. In some examples, the store instruction data store 207 is not architecturally visible. In some examples, access to the store instruction data store 207 is configured to be limited to processor operation in a supervisory mode or other protected mode of the processor.

VI. Example Block Instruction Target Encoding

Figure 4:
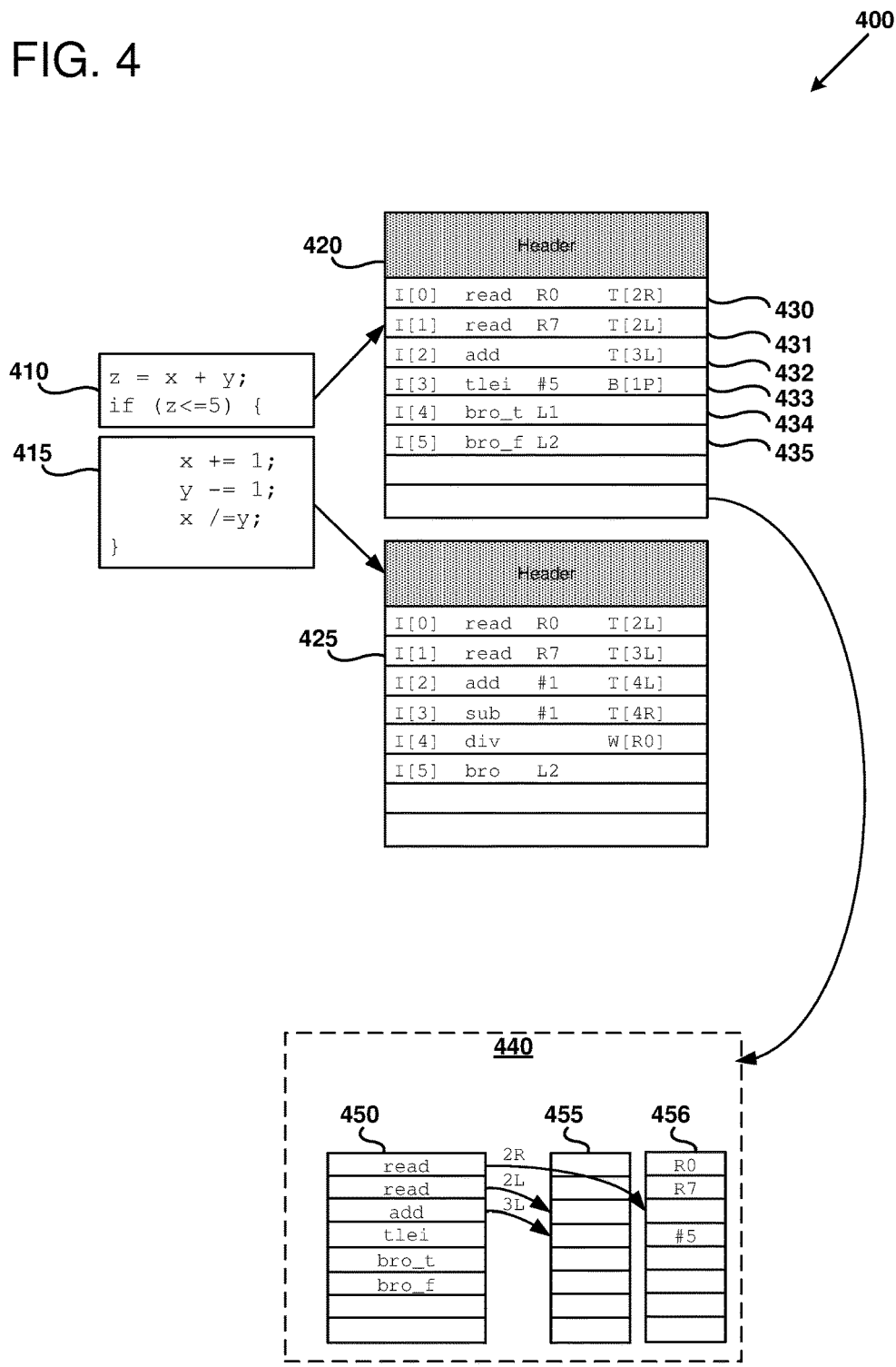
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432 (2R indicates targeting the right operand of instruction number 2; 2L indicates the left operand of instruction number 2). In the illustrated ISA, the read instruction is the only instruction that reads from the global register file (e.g., register file 230); however any instruction can target, the global register file. When the ADD instruction 432 receives the result of both register reads it will become ready and execute. It is noted that the present disclosure sometimes refers to the right operand as OP0 and the left operand as OP1.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 434 and BRO_F 435). The branch instruction that receives a matching predicate will fire (execute), but the other instruction, encoded with the complementary predicated, will not fire/execute.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R0 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

VII. Example Block-Based Instruction Formats

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a store mask field 515, a number of exit type fields, a number of execution flag fields, an instruction block size field, and an instruction header ID bit (the least significant bit of the instruction header). In some examples, the store mask field 515 is replaced or supplemented by an LSID count 517, which can indicate the number of store instructions on each predicate path of the instruction block (or a total number of store instructions for an instruction block). For instruction blocks that have different numbers of store instructions on different predicate paths, one or more instructions can be nullified, and the executed count of store instructions incremented, such that each predicate path will indicate the same number of store instructions have executed at runtime. In some examples, the header 510 does not indicate either an LSID count or store mask, but the information is generated dynamically by the instruction decoder based on LSIDs encoded in individual store instructions.

The execution flag fields depicted in FIG. 5 occupy bits 6 through 13 of the instruction block header 510 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions.

The illustrated generic block instruction 520 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions that are decoded and executed.

The target fields T1 and T2 specifying the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), a load store ID field (LSID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory). The LSID field specifies a relative order for load and store instructions within a block. In other words, a higher-numbered LSID indicates that the instruction should execute after a lower-numbered LSID. In some examples, the processor can determine that two load/store instructions do not conflict (e.g., based on the read/write address for the instruction) and can execute the instructions in a different order, although the resulting state of the machine should not be different than as if the instructions had executed in the designated LSID ordering. In some examples, load/store instructions having mutually exclusive predicate values can use the same LSID value. For example, if a first load/store instruction is predicated on a value p being true, and second load/store instruction is predicated on a value p being false, then each instruction can have the same LSID value.

VIII. Example Processor State Diagram

Figure 6:
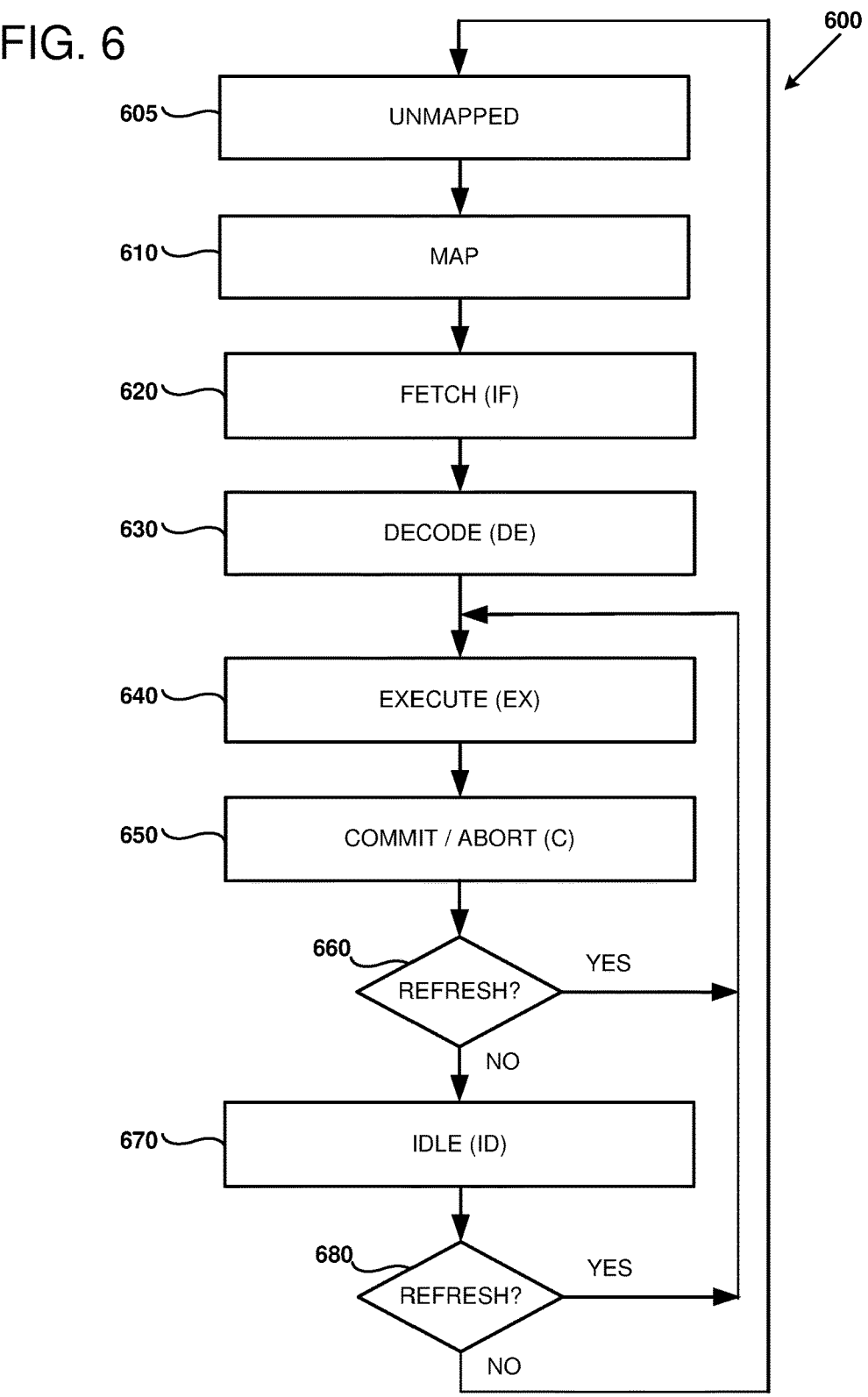
FIG. 6 is a state diagram illustrating a number of states assigned to an instruction block as it is mapped, executed, and retired.

FIG. 6 is a state diagram 600 illustrating number of states assigned to an instruction block as it is mapped, executed, and retired. For example, one or more of the states can be assigned during execution of an instruction according to one or more execution flags. It should be readily understood that the states shown in FIG. 6 are for one example of the disclosed technology, but that in other examples an instruction block may have additional or fewer states, as well as having different states than those depicted in the state diagram 600. At state 605, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 610, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 620.

When the instruction block is in the fetch state 620 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction. For example, the decoded instructions can be stored in one of the memory stores 215 or 216 shown above, in FIG. 2. The decoding includes generating dependencies for the decoded instruction, operand information for the decoded instruction, and targets for the decoded instruction. Once at least one instruction of the instruction block has been decoded, the instruction block can proceed to execution state 640.

During the execution state 640, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort 650. In some examples, the control logic uses a write mask and/or a store mask for an instruction block to determine whether execution has proceeded sufficiently to commit the instruction block. Executed memory access instructions send data and address information to a load/store queue for accessing memory. In some examples, some memory access instructions (e.g., memory load instructions) can be performed before the block executes while other instructions (e.g., memory store instructions) wait to execute until the block is committing. In some examples, all memory access instructions wait to access memory until the block is committing. In some examples, memory load and store instructions access memory during execution of the instruction block, but additional hardware catches memory hazard conditions (e.g., read after write hazards) to ensure that the main memory appears as if the instructions were executed according to their relative ordering.

At the commit/abort state 650, the processor core control unit determines that operations performed by the instruction block can be completed. For example, memory load store operations, register read/writes, branch instructions, and other instructions will definitely be performed according to the control flow of the instruction block. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Any outstanding memory access operations are also completed. Regardless of whether the instruction block has committed or aborted, the instruction block goes to state 660 to determine whether the instruction block should be refreshed. If the instruction block is refreshed, the processor core re-executes the instruction block, typically using new data values, particularly the registers and memory updated by the just-committed execution of the block, and proceeds directly to the execute state 640. Thus, the time and energy spent in mapping, fetching, and decoding the instruction block can be avoided. Alternatively, if the instruction block is not to be refreshed, then the instruction block enters an idle state 670.

In the idle state 670, the processor core executing the instruction block can be idled by, for example, powering down hardware within the processor core, while maintaining at least a portion of the decoded instructions for the instruction block. At some point, the control unit determines 680 whether the idle instruction block on the processor core is to be refreshed or not. If the idle instruction block is to be refreshed, the instruction block can resume execution at execute state 640. Alternatively, if the instruction block is not to be refreshed, then the instruction block is unmapped and the processor core can be flushed and subsequently instruction blocks can be mapped to the flushed processor core.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Block-Based Processor and Memory Configuration

FIG. 7 is a diagram 700 illustrating an apparatus comprising a block-based processor 710, including a control unit 720 configured to execute instruction blocks according to data for one or more operation modes. The control unit 720 includes a core scheduler 725 and a memory access hardware structure 730. The core scheduler 725 schedules the flow of instructions including allocation and de-allocation of cores for performing instruction processing, control of input data and output data between any of the cores, register files, memory interfaces and/or I/O interfaces. The memory access hardware structure 730 stores data including, for example, store mask (SM) data, store count (SC) data, and/or other data such as control flow data. The memory access hardware structure 730 can be implemented using any suitable technology, including SRAM, registers (e.g., including arrays of flip-flops or latches), or other suitable memory technology. The store mask (SM) and store count (SC) can be generated when decoding instructions by the control unit 720. In some examples, the store mask and store count are read from the memory 750 (e.g., store mask 751 and store count 752), from instruction block headers (e.g., store masks 737a and 738a, and store counts 737b and 738b), or in a computer-readable storage medium, such as a storage media disc 755.

The block-based processor 710 also includes one or more processor cores 740-747 configured to fetch and execute instruction blocks. The illustrated block-based processor 710 has up to eight cores, but in other examples there could be 64, 512, 1024, or other numbers of block-based processor cores. The block-based processor 710 is coupled to a memory 750 which includes a number of instruction blocks, including instruction blocks A and B, and to a computer-readable storage media disc 755.

X. Example Nullification Instruction Formats

Figure 8:
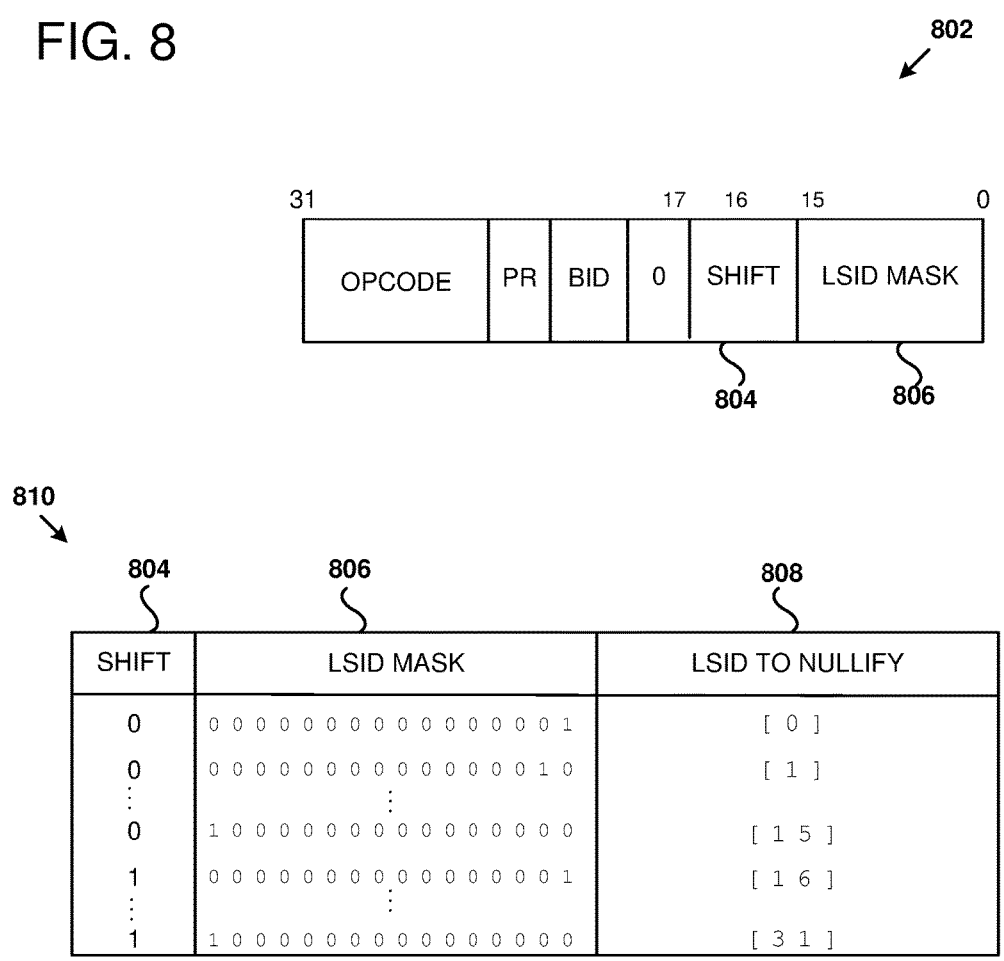
FIG. 8 illustrates an example nullification instruction using a shift bit and an LSID mask as can be used in certain examples of the disclosed technology.

FIG. 8 illustrates an example nullification instruction using a shift bit and an LSID mask as can be used in certain examples of the disclosed technology. Referring to FIG. 8, there is illustrated an example instruction format for a nullification instruction 802. The opcode field specifies the operation performed by the instruction 802, such as a nullification operation. The predicate field (PR) specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions that are decoded and executed. A broadcast ID (BID) field can follow the PR field. The nullification instruction 802 also includes a shift bit 804 and an LSID mask 806 in its target field. The LSID mask 806 can indicate an LSID of a memory access instruction (e.g., a memory store), which will be nullified by the nullification instruction 802. When a memory access instruction identified by the LSID is nullified, its LSID can be marked as completed as if the memory access instruction has executed.

Table 810 illustrates example LSIDs that can be determined using the LSID mask 806 and the shift bit 804. For example, the LSID mask 806 can be a 16-bit mask, so that 32 total number of LSIDs can be represented by the 16-bit LSID mask and 2 possible values for the shift bit 804. In this regard, the same LSID mask (e.g., 0000000000000001) can represent two different LSIDs (e.g., [0] and [16]) for corresponding values of the shift bit 804 (e.g., for shift bit 0 and 1, respectively).

Figures 9, 10:
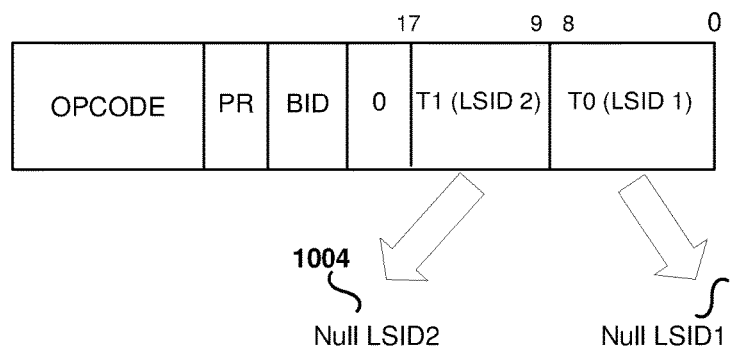
FIG. 9 illustrates example LSID masks for nullifying multiple store instructions as can be used in certain examples of the disclosed technology.
FIG. 10 illustrates an example nullification instruction with two separate LSIDs in the target fields as can be used in certain examples of the disclosed technology.

FIG. 9 illustrates example LSID masks for nullifying multiple store instructions as can be used in certain examples of the disclosed technology. In some examples, the nullification instruction 802 can use an LSID mask which can indicate more than one LSID for nullification. The LSID mask can be associated with LSIDs [0]-[15] for shift bit 0, and LSIDs [16]-[32] for shift bit 1. As seen in table 900, more than one bit can be set in the LSID mask, indicating a corresponding LSID for nullification. For example, the LSID mask 902 has bits 0 and 1 set, which indicates LSIDs {0} and [1] for nullification. LSID mask 904 indicates LSIDs [0], [1], [2], [13], and [14] for nullification. Similarly, LSID mask 906 indicates LSIDs [29] and [30] since shift bit is set to 1.

FIG. 10 illustrates an example nullification instruction with two separate LSIDs in the target fields as can be used in certain examples of the disclosed technology. Referring to FIG. 10, the nullification instruction 1002 includes two separate 9-bit target fields, T0 and T1. In some examples, each target field can store an LSID mask (e.g., as illustrated in FIG. 8) for two separate LSIDs. In yet other examples, the two target fields can store two separate LSIDs—LSID1 and LSID2. In this regard, a single nullification instruction 1002 can be used to nullify both LSID1 and LSID2 (1004 and 1006 in FIG. 10).

XI. Example Control Flow Graphs

FIGS. 11A-11D illustrate example control flow graphs with store instruction nullification as can be used in certain examples of the disclosed technology. Referring to FIGS. 11A-11D, the control flow graphs 1102, 1120, 1126 and 1140 are depicted in a graphical form for ease of illustration including nodes and edges, but can be represented in other forms, as will be readily apparent to one of ordinary skill in the relevant art. For ease of explanation, only load and store instructions are shown in the control flow graph, but it should be understood that other instructions will be placed or referenced by nodes of the control flow graph according to each respective instruction's dependencies and predicates.

Figure 11A:
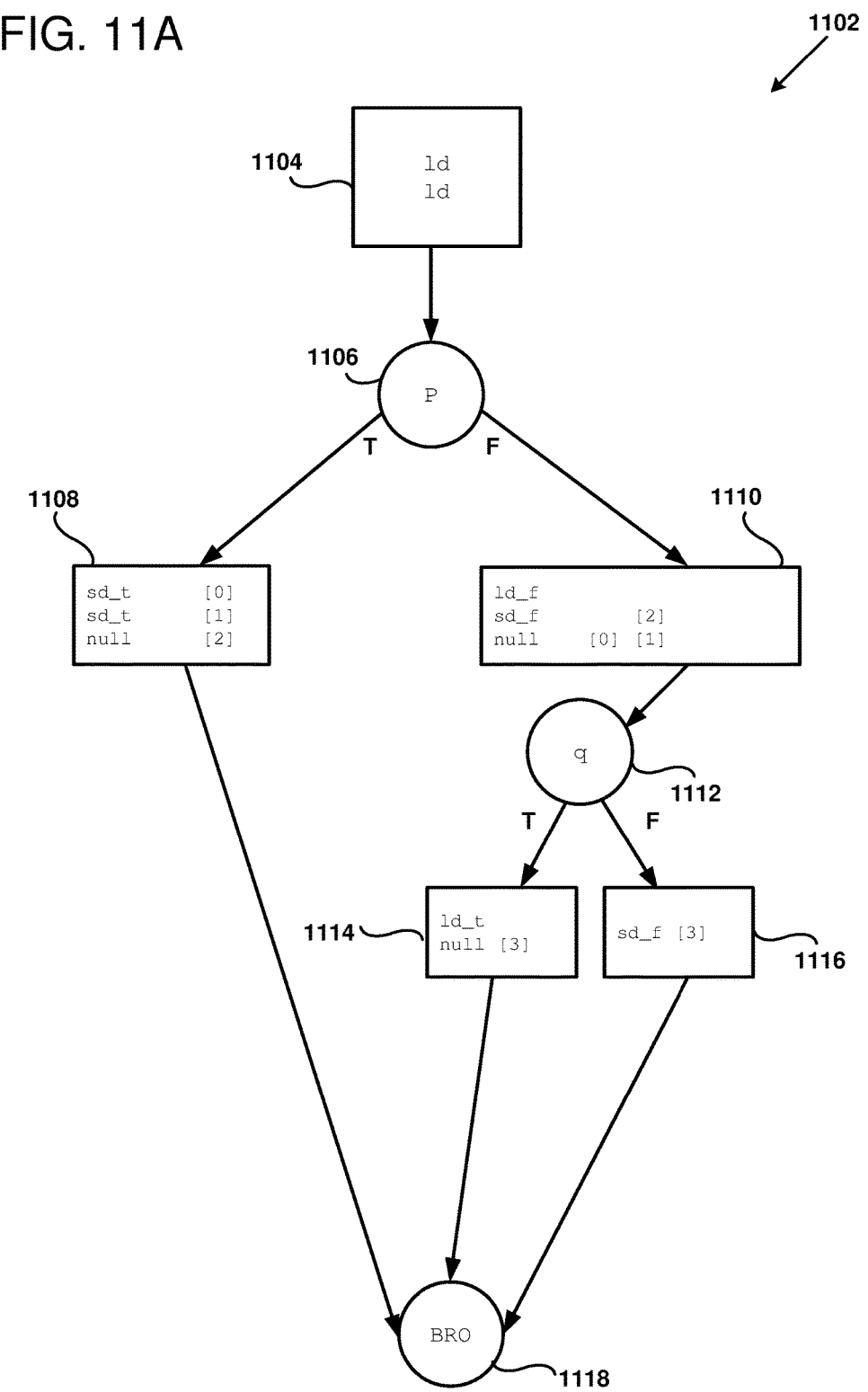
FIGS. 11A-11D illustrate example control flow graphs with store instruction nullification as can be used in certain examples of the disclosed technology.

Referring to graph 1102 in FIG. 11A, the first node 1104 includes two load (LD) instructions. For ease of illustration, only the Store (ST) instructions have an associated LSID, and not the LD instructions. The two LD instructions are unpredicted and can issue and execute as soon as their operands are available. Node 1106 includes a predicated instruction p, which can be associated with a condition. Based on whether the condition is True or False, instruction execution can proceed to nodes 1108 and 1110, respectively. At node 1108, two ST instructions with LSIDs [0] and [1] can execute. Since store instruction with LSID [2] will not execute, a Nullification (Null) instruction for LSID [2] is inserted in node 1108. If the predicated instruction condition of instruction p is false and execution proceeds to node 1110, only store instruction with LSID [2] will execute, and ST instructions with LSIDs [0] and [1] will not execute. Therefore, since all memory access instructions have to be accounted for (and produced) in order for the instruction block to commit, node 1110 has to include a nullification instruction to nullify LSIDs [0] and [1]. The LSIDs can be encoded as part of the target field of the nullification instruction (e.g., as described in FIGS. 8-10).

The nullification instruction ("Null [0] [1]") can be automatically generated and inserted in the instruction block by the compiler to account for all LSIDs and balance the number of memory access instructions that appear to have been executed for each path of the control flow graph. The effect of a nullification instruction associated with an LSID (e.g., specifying a store instruction LSID in its target field) can be that the LSID is marked as completed as if the memory access instruction associated with the LSID has executed. In some other examples, a store instruction is nullified by the processor core hardware such that it appears as if a memory store instruction has executed, but without storing/inserting a separate nullification instruction in the instruction block.

In yet some other examples, an instruction counter (e.g., a store instruction counter) can be incremented for purposes of instruction nullification. For example, a store instruction count can be set at 2 for the True arm of predicated instruction p, a second store instruction count can be set to 2 for the false arm of instruction p. Each counter can be decreased every time a store instruction is executed (regardless of which predicated arm is selected), and the predicated instruction p can be committed once at least one of the counters reaches 0. In other examples, a single store instruction count can also be used and the count can be adjusted after each store instruction is executed and a store instruction in a non-executing predicated arm is not executed.

After instruction node 1110, node 1112 can execute, which is a predicated instruction q, which includes predicated paths for True (node 1114) and False (node 1116) outcomes of an associated condition. Since only node 1116 (and not 1114) includes a ST instruction (LSID [3]), a corresponding Null instruction is inserted in node 1114, which can be used to nullify Store with LSID [3]. The conditional flow graph 1102 completes with a Branch instruction (BRO) at node 1118, which can be used to resume instruction execution at another instruction block.

Figure 11B:
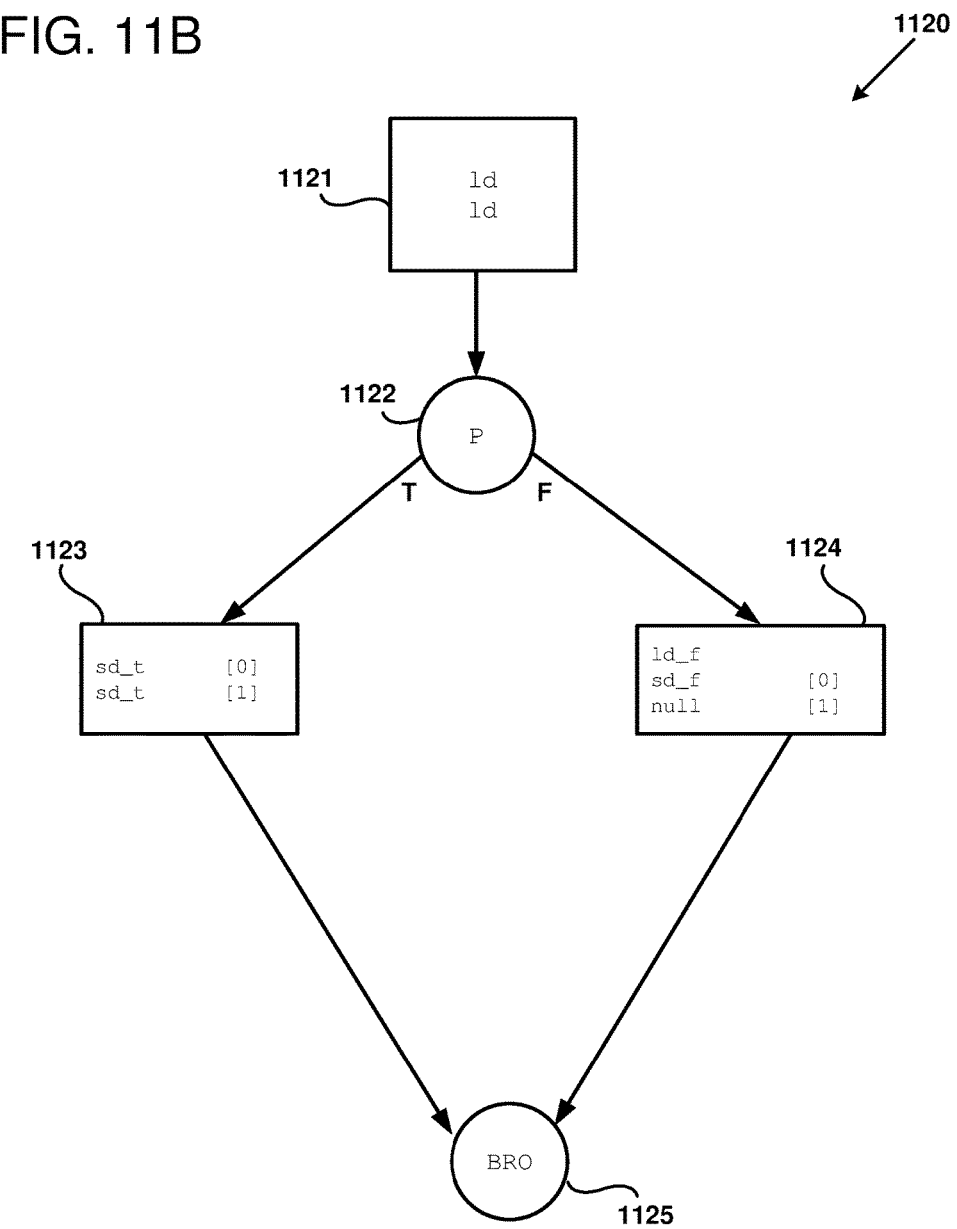

Referring to FIG. 11B, the control flow graph 1120 includes node 1121 with two Load instructions, a predicated instruction p in node 1122, and a branch instruction in node 1125. Predicated execution paths of instruction p include a True path with node 1123 and a False path with node 1124. As seen in FIG. 11B, the LSIDs are used only for Store instructions, and the LSIDs are overlapping between opposite predicated execution paths. For example, since node 1123 has two Store instructions with LSIDs [0] and [1], LSID [0] can be re-used for the single Store instruction in node 1124. Additionally, a nullification instruction identifying LSID [1] in its target field can be added/inserted for node 1124 in order to account for all available LSIDs so that the predicated instruction p can commit and instruction execution can branch at node 1125.

Figure 11C:
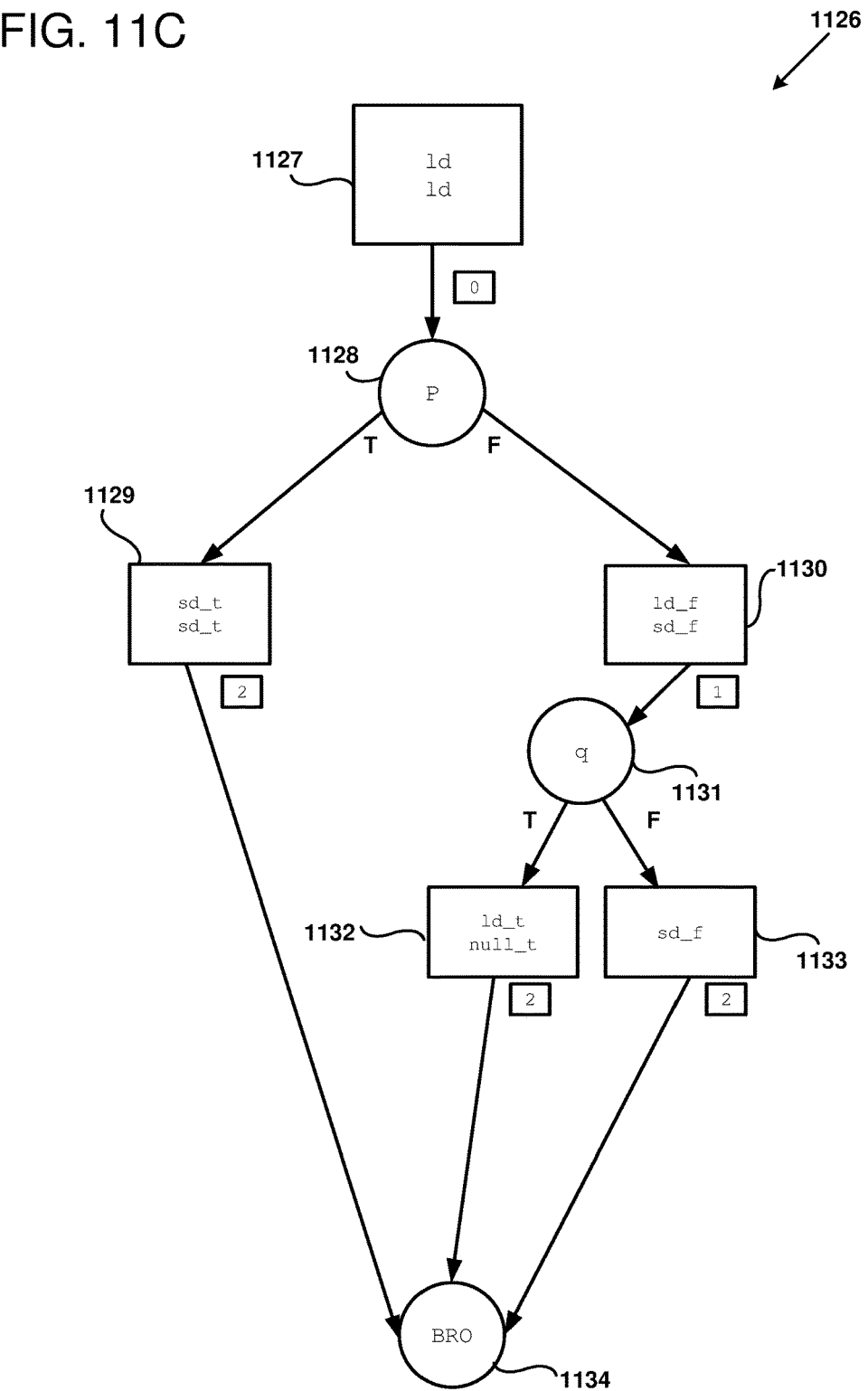

Referring to FIG. 11C, the control flow graph 1126 is similar to graph 1102 in FIG. 11A. However, a number of edges of the control flow graph 1126 have been updated to indicate the number of memory store instructions that will have executed after the associated source code portion has been executed. For example, node 1127 does not include any store instructions and the count is set to 0 on the edge leaving node 1127. Source code portion of node 1129 includes 2 store instructions and, thus, the edge exiting node 1129 is set with a count of 2. Source code portion of node 1130 includes 1 store instruction and, thus, the edge exiting node 1130 is set with a count of 1. The node 1133 has one store instruction, but the count at the exit of node 1133 is set to 2, which is the cumulative number of store instructions (one in 1130 and one in 1133), which would execute for that path through the control flow graph. Further, as shown, source code portion of node 1132 does not include a store instruction, but a Null instruction has been inserted, that will increment the memory store instruction count, which is indicated as 2 at the exit of node 1132. At node 1134, it may be determined that the branch instruction can be executed when the store instruction count from any of the paths reaching node 1134 has been incremented to 2. In some examples, in lieu of inserting the null instruction in node 1132, the counter can simply be incremented to 2 at the exit of node 1132, in order to account for the non-executing store instruction in node 1133.

Figure 11D:
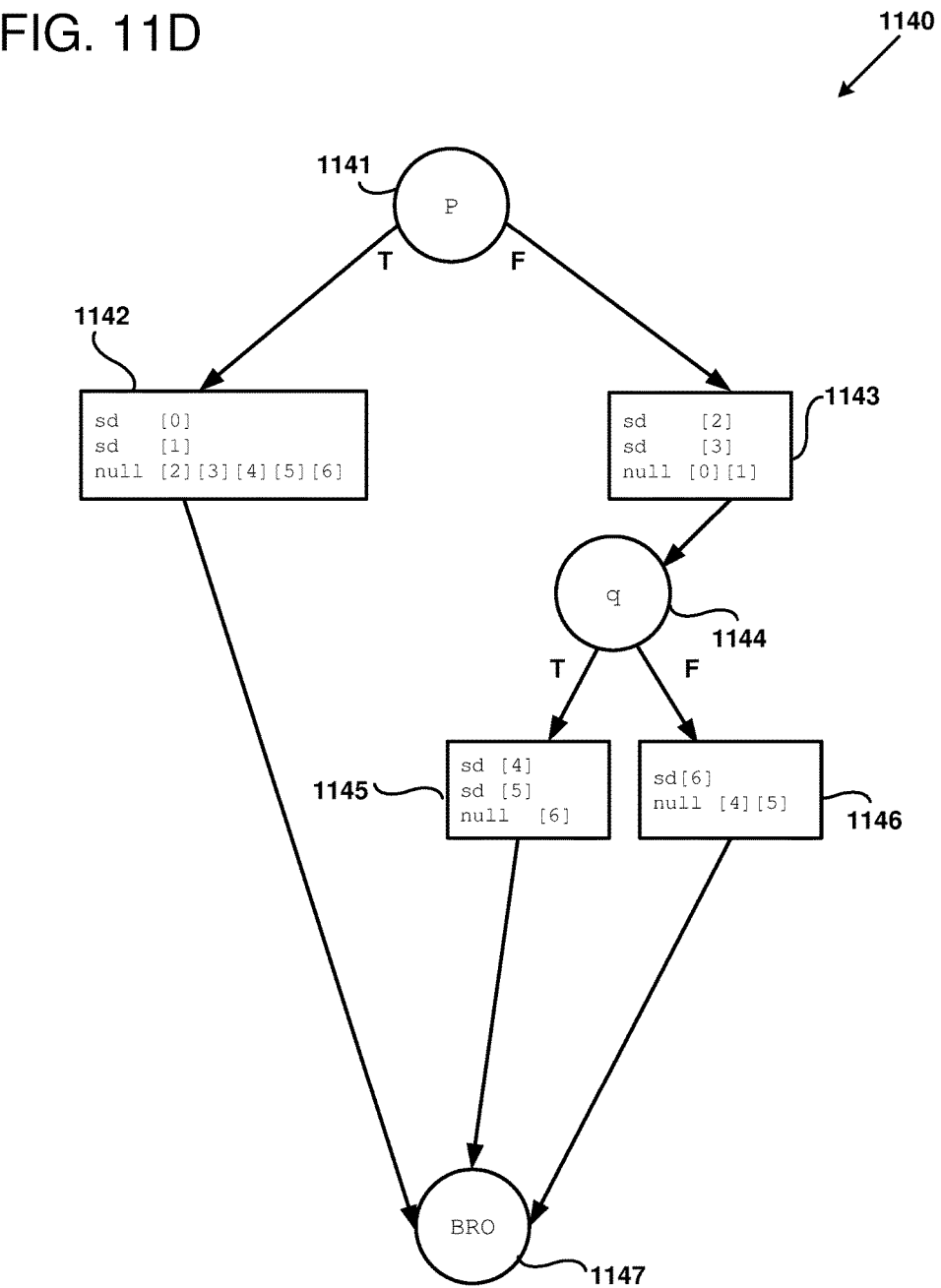

Referring to FIG. 11D, the control flow graph 1140 includes predicated instructions p and q, similar to the graph in FIG. 11A. However, graph 1140 illustrates the use of a single nullification instruction to nullify multiple store instructions. More specifically, if processing proceeds to nodes 1141, 1142 and 1147, then store instructions with LSIDs [2], [3], [4], [5], and [6] have to be nullified at node 1142. Therefore, a single Null instruction can be generated and inserted in node 1142, where multiple LSIDs [2]-[6] can be specified in the target field (e.g., by using an LSID mask as described in FIG. 9. Similarly, if processing proceeds to nodes 1141, 1143, a nullification instruction for LSIDs [0]-[1] (for the stores in the non-executing node 1142) is inserted at node 1143. Nullification instructions for LSIDs [6] and [4]/[5] are inserted in nodes 1145 and 1146, respectively.

XII. Example Methods of Instruction Nullification

Figure 12:
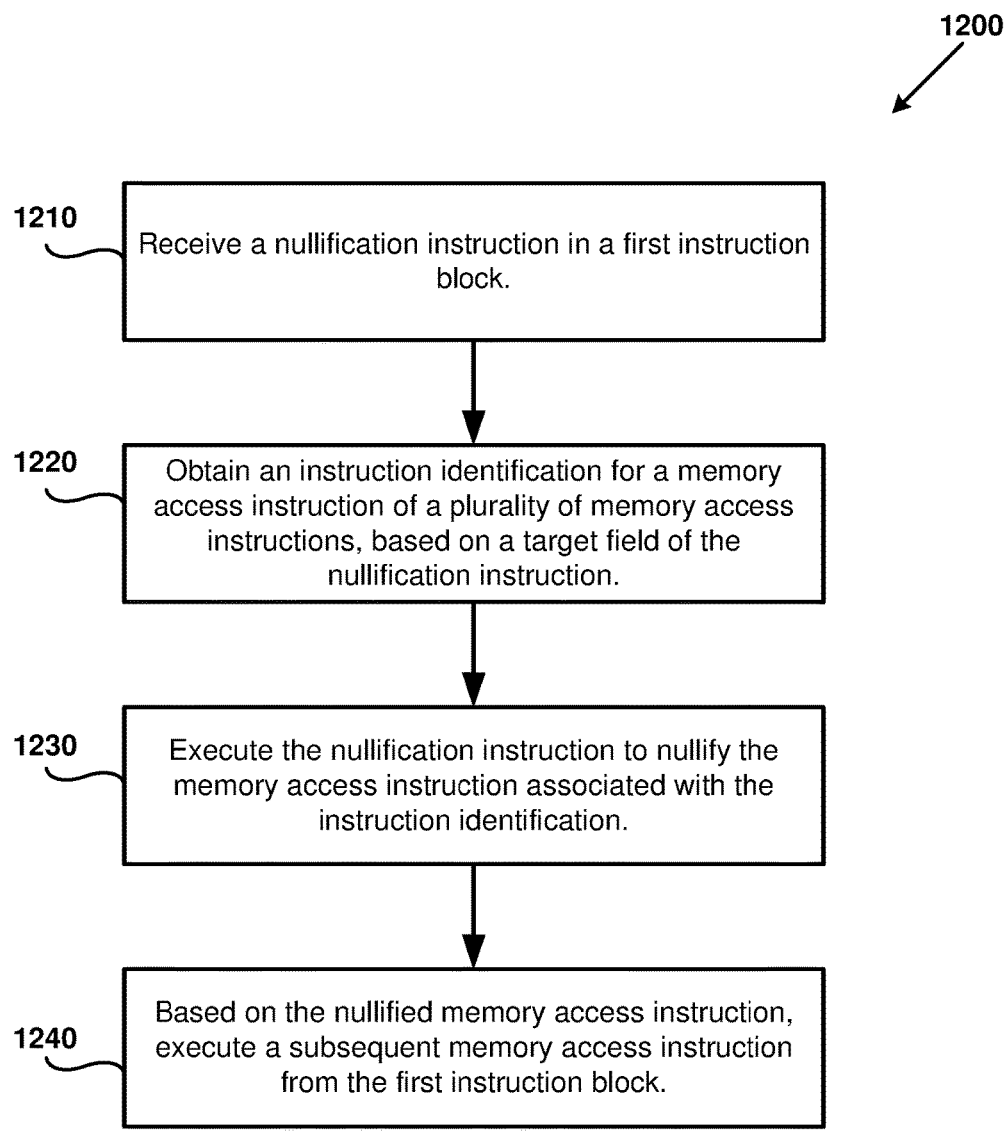

FIGS. 12-13 are flowcharts outlining example methods of nullifying memory access instructions, as can be used in certain examples of the disclosed technology. Referring to FIG. 12, the example method 1200 starts at 1210, when a nullification n instruction is received in a first instruction block. For example, a nullification instruction can be received for node 1143 in FIG. 11D. At 1220, an instruction identification is obtained for a memory access instruction of a plurality of memory access instructions, based on a target field of the nullification (Null) instruction. For example, LSIDs [0] and [1] can be encoded (e.g., by using an LSID mask as seen in FIG. 9) in the target field of the Null instruction. At 1230, the nullification instruction is executed to nullify the memory access instruction associated with the instruction identification. For example, the nullification instruction in node 1143 is executed to nullify the store instructions with LSIDs [0] and [1] (e.g., the LSIDs [0] and [1] can be marked as if the store instructions with those LSIDs have executed). At 1240, a subsequent memory access instruction from the first instruction block is executed, based on the nullified memory access instruction. For example, after the nullification instruction in node 1143 is executed and memory stores with LSIDs [0]-[1] are nullified, processing can resume by executing the predicated instruction in node 1144.

Referring to FIG. 13, the example method 1300 starts at 1310, when data indicating execution ordering of a plurality of memory store instructions is retrieved. For example, a store mask 515 or LSID count 517 is retrieved from the header 510 of an instruction block. At 1320, a predicated instruction is detected during instruction execution. For example, a predicated instruction p in node 1106 is detected. At 1330, at least a first memory store instruction of the plurality of memory store instructions is determined, where the memory access instruction will not execute when a condition of the predicated instruction is satisfied. For example, when condition for instruction p is True and node 1108 is executed, store instruction with LSID [2] in node 1110 will not execute. At 1340, a nullification instruction is generated, where a target field of the nullification instruction identifies a load/store identifier (LSID) of the first memory store instruction. For example, a nullification instruction identifying LSID [2] in its target field is generated and inserted in the instructions for node 1108. At 1350, the first memory store instruction (e.g., memory store with LSID [2]) is nullified and the predicated instruction (e.g., instruction p) issues.

XIII. Exemplary Computing Environment

Figure 14:
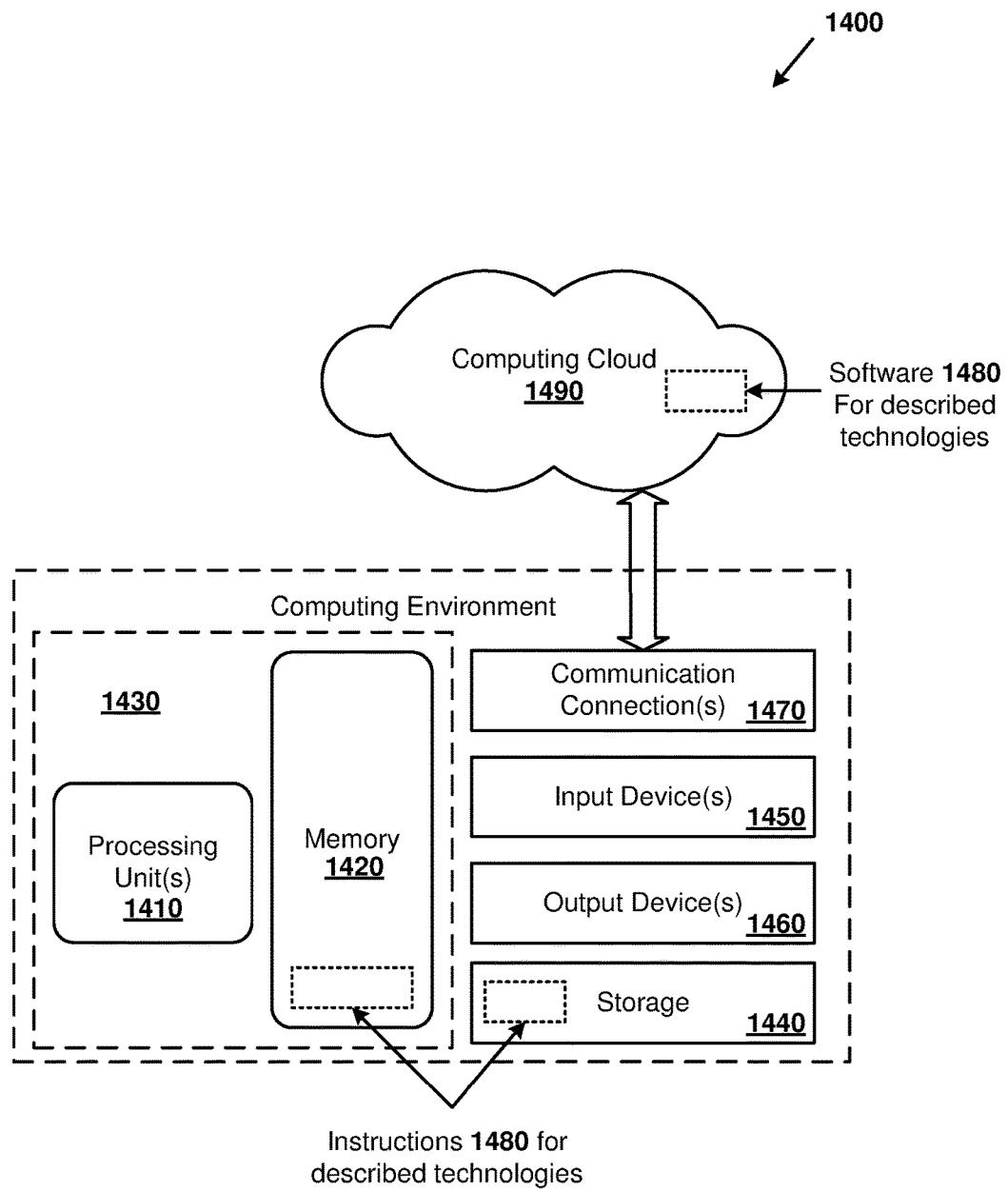
FIG. 14 is a block diagram illustrating a suitable computing environment for implementing some embodiments of the disclosed technology.

FIG. 14 illustrates a generalized example of a suitable computing environment 1400 in which described embodiments, techniques, and technologies, including configuring a block-based processor, can be implemented. For example, the computing environment 1400 can implement disclosed techniques for configuring a processor to operating according to one or more instruction blocks, or compile code into computer-executable instructions for performing such operations, as described herein.

The computing environment 1400 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 14, the computing environment 1400 includes at least one block-based processing unit 1410 and memory 1420. In FIG. 14, this most basic configuration 1430 is included within a dashed line. The block-based processing unit 1410 executes computer-executable instructions and may be a real or a virtual processor. In a multi-processing system, multiple processing units execute computer-executable instructions to increase processing power and as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480, images, and video that can, for example, implement the technologies described herein. A computing environment may have additional features. For example, the computing environment 1400 includes storage 1440, one or more input device(s) 1450, one or more output device(s) 1460, and one or more communication connection(s) 1470. An interconnection mechanism (not shown) such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and that can be accessed within the computing environment 1400. The storage 1440 stores instructions for the software 1480, plugin data, and messages, which can be used to implement technologies described herein.

The input device(s) 1450 may be a touch input device, such as a keyboard, keypad, mouse, touch screen display, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400.

The communication connection(s) 1470 enable communication over a communication medium (e.g., a connecting network) to another computing entity. The communication medium conveys information such as computer-executable instructions, compressed graphics information, video, or other data in a modulated data signal. The communication connection(s) 1470 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1490. For example, disclosed compilers and/or block-based-processor servers are located in the computing environment, or the disclosed compilers can be executed on servers located in the computing cloud 1490. In some examples, the disclosed compilers execute on traditional central processing units (e.g., RISC or CISC processors).

Computer-readable media are any available media that can be accessed within a computing environment 1400. By way of example, and not limitation, with the computing environment 1400, computer-readable media include memory 1420 and/or storage 1440. As should be readily understood, the term computer-readable storage media includes the media for data storage such as memory 1420 and storage 1440, and not transmission media such as modulated data signals.

XIV. Additional Examples of the Disclosed Technology

Additional examples of the disclosed subject matter are discussed herein in accordance with the examples discussed above.

In one embodiment, an apparatus includes a block-based processor. The block-based processor includes one or more processing cores configured to fetch and execute a plurality of instruction blocks. The processor also includes a control unit configured, based at least in part on receiving a nullification instruction, to obtain an instruction identification for a memory access instruction of a plurality of memory access instructions, based on a target field of the nullification instruction. The control unit is further configured to nullify the memory access instruction associated with the instruction identification. The memory access instruction is in a first instruction block of the plurality of instruction blocks. The control unit is further configured to, based on the nullified memory access instruction, execute a subsequent memory access instruction from the first instruction block. The control unit is configured to nullify the memory access instruction by fetching and executing the nullification instruction encoded in the first instruction block.

The apparatus further includes a hardware structure configured to store data indicating execution ordering of the plurality of memory access instructions. The data indicating execution ordering is a store mask based at least in part on a plurality of load/store identifiers (LSIDs) encoded for the plurality memory access instructions in the first instruction block. The memory access instruction is a memory store instruction, and the instruction identification comprises an LSID from the plurality of LSIDs for the memory store instruction. The instruction identification is an LSID, and the control unit is further configured, during the nullifying, to mark the LSID of the memory access instruction as completed as if the memory access instruction has executed.

The apparatus further includes an instruction decoder configured to decode the plurality of memory access instructions of the first instruction block, and detect at least one predicated instruction. The predicated instruction is associated with a first predicated execution path and a second predicated execution path. The control unit is further configured to, during execution of instructions in the first predicated execution path, detect a memory store instruction in the second predicated execution path, and nullify the memory store instruction while executing the instructions in the first predicated execution path, as if the memory store instruction has executed. The nullifying of the memory store instruction while executing the instructions in the first predicated execution path takes place without inserting a separate nullification instruction in the first instruction block.

The control unit is configured to nullify the memory access instruction by increasing a count of store instructions that have been executed within the first instruction block. The control unit is configured to execute the subsequent memory access instruction when the count of store instructions reaches a pre-determined value. The control unit is further configured to, based on the nullified memory access instruction, commit the first instruction block and execute at least one instruction from at least a second instruction block of the plurality of instruction blocks.

In one embodiment, a method of operating a processor to execute a block of instructions with a plurality of memory store instructions includes retrieving data indicating execution ordering of the plurality of memory store instructions. A predicated instruction is detected during instruction execution. It is determined that at least a first memory store instruction of the plurality of memory store instructions will not execute when a condition of the predicated instruction is satisfied. A nullification instruction is generated, where a target field of the nullification instruction identifies a load/store identifier (LSID) of the first memory store instruction. The predicated instruction then issues. The target field further comprises a mask and a shift bit, the LSID of the first memory store instruction identified based on the mask and the shift bit. The target field of the nullification instruction includes a mask identifying multiple memory store instructions of the plurality of memory store instructions. During execution of the block of instructions, it may be detected that the condition of the predicated instruction is not satisfied. The multiple memory store instructions identified by the nullification instruction are then nullified. The nullifying further includes proceeding execution of a subsequent memory access instruction as if the multiple memory store instructions have executed. The first memory store instruction is in a first predicated execution path of the predicated instruction, and the method further includes executing the nullification instruction during executing instructions in a second predicated execution path of the predicated instruction. The executing of the nullification instruction includes marking the LSID of the first memory store instruction as completed, as if the first memory store instruction has executed.

In one embodiment, one or more computer-readable storage media storing computer-readable instructions for an instruction block that when executed by a block-based processor, cause the processor to perform a method. The computer-readable instructions include instructions for analyzing memory accesses encoded in source code and/or object code to determine memory dependencies for the instruction block. The computer-readable instructions also include instructions for transforming the source code and/or object code into computer-executable code for the instruction block, the computer-executable code including memory access instructions that can be used to generate one or more nullification instructions. The computer-readable instructions further include instructions for storing the one or more nullification instructions in the instruction block. The one or more nullification instructions include a target field identifying a load/store identifier of at least one of the memory access instructions.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising a block-based processor, the block-based processor comprising:
   one or more processing cores; and
   a control unit configured, based at least in part on executing a nullification instruction encoded in a first instruction block, to cause at least one of the processing cores to:
      obtain an instruction identification for a memory access instruction of a plurality of memory access instructions encoded in the first instruction block, based on a target field of the nullification instruction;
      nullify the memory access instruction associated with the instruction identification, causing the nullified memory access instruction to not execute; and
      based on the nullified memory access instruction, execute a subsequent memory access instruction from the first instruction block.

2. The apparatus of claim 1, wherein the control unit is configured to nullify the memory access instruction by fetching and executing the nullification instruction encoded in the first instruction block.

3. The apparatus of claim 1, further comprising:
   a hardware structure configured to store data indicating execution ordering of the plurality of memory access instructions, wherein the data indicating execution ordering is a store mask based at least in part on a plurality of load/store identifiers (LSIDs) encoded for the plurality memory access instructions in the first instruction block.

4. The apparatus of claim 3, wherein the memory access instruction is a memory store instruction, and the instruction identification comprises an LSID from the plurality of LSIDs for the memory store instruction.

5. The apparatus of claim 1, wherein the instruction identification is an LSID, and the control unit is further configured, during the nullifying, to mark the LSID of the memory access instruction as completed as if the memory access instruction has executed.

6. The apparatus of claim 1, further comprising an instruction decoder configured to:
   decode the plurality of memory access instructions of the first instruction block; and
   detect at least one predicated instruction of the plurality of memory access instructions, the predicated instruction being associated with a first predicated execution path and a second predicated execution path.

7. The apparatus of claim 6, wherein the control unit is further configured to, during execution of instructions in the first predicated execution path:
   detect a memory store instruction in the second predicated execution path; and
   nullify the memory store instruction while executing the instructions in the first predicated execution path, as if the memory store instruction has executed.

8. The apparatus of claim 7, wherein the nullifying of the memory store instruction while executing the instructions in the first predicated execution path takes place without inserting a separate nullification instruction in the first instruction block.

9. The apparatus of claim 1, wherein the control unit is configured to nullify the memory access instruction by increasing a count of store instructions that have been executed within the first instruction block.

10. The apparatus of claim 9, wherein the control unit is configured to execute the subsequent memory access instruction when the count of store instructions reaches a pre-determined value.

11. The apparatus of claim 10, wherein the control unit is further configured to:
    based on the nullified memory access instruction, commit the first instruction block and execute at least one instruction from at least a second, different instruction block.

12. A method of operating a processor to execute a block of instructions comprising a plurality of memory store instructions, the method comprising:
    retrieving data indicating execution ordering of the plurality of memory store instructions;
    detecting a predicated instruction during instruction execution;
    determining at least one predicated, first memory store instruction of the plurality of memory store instructions will not execute when a condition of the predicated instruction is satisfied;
    generating a nullification instruction, wherein a target field of the nullification instruction identifies a load/store identifier (LSID) indicating a relative ordering for executing the first memory store instruction; and
    issuing the predicated instruction.

13. The method according to claim 12, wherein the target field further comprises a mask and a shift bit, the LSID of the first memory store instruction identified based on the mask and the shift bit.

14. The method according to claim 12, wherein the target field of the nullification instruction comprises a mask identifying multiple memory store instructions of the plurality of memory store instructions.

15. The method according to claim 14, further comprising:
    detecting during execution of the block of instructions that the condition of the predicated instruction is not satisfied; and
    nullifying the multiple memory store instructions identified by the nullification instruction.

16. The method according to claim 15, wherein the nullifying further comprises:
    proceeding execution of a subsequent memory access instruction as if the multiple memory store instructions have executed.

17. The method according to claim 12, wherein the first memory store instruction is in a first predicated execution path of the predicated instruction, and the method further comprising:

executing the nullification instruction during executing instructions in a second predicated execution path of the predicated instruction.

18. The method according to claim 17, wherein the executing of the nullification instruction comprises:
marking the LSID of the first memory store instruction as completed, as if the first memory store instruction has executed.

19. The method of claim 12, further comprising storing computer-readable instructions for an instruction block that when executed by a block-based processor, cause the processor to perform the recited acts of retrieving data, detecting the predicated instruction, determining at least one predicated, first memory store instruction, generating the nullification instruction, and issuing the predicated instruction.

20. One or more computer-readable storage media storing computer-readable instructions that when executed by a processor, cause the processor to perform a method, the computer-readable instructions comprising:
instructions for analyzing memory accesses encoded in source code and/or object code to determine memory dependencies for an instruction block executable by a block-based processor; and
instructions for transforming the source code and/or object code into computer-executable code for the instruction block, the computer-executable code including:
memory access instructions comprising at least one predicated memory access instruction, and
at least one nullification instruction comprising a target field identifying a load/store identifier indicating a relative ordering for executing at least one of the memory access instructions.

21. A method, comprising:
responsive to executing a nullification instruction encoded in a first instruction block, causing a processor to:
obtain an instruction identification for a memory access instruction of a plurality of memory access instructions encoded in the first instruction block, based on a target field of the nullification instruction;
nullify the memory access instruction associated with the instruction identification, causing the nullified memory access instruction to not execute; and
based on the nullified memory access instruction, execute a subsequent memory access instruction from the first instruction block.

22. The method of claim 21, further comprising, by the processor:
nullifying the memory access instruction by fetching and executing the nullification instruction encoded in the first instruction block.

23. The method of claim 22, further comprising, by the processor:
storing data in a hardware structure indicating execution ordering of the plurality of memory access instructions, wherein the data indicating execution ordering is a store mask based at least in part on a plurality of load/store identifiers (LSIDs) encoded for the plurality memory access instructions in the first instruction block.

24. The method of claim 23, wherein the memory access instruction is a memory store instruction, and the instruction identification comprises an LSID from the plurality of LSIDs for the memory store instruction.

25. The method of claim 21, wherein the instruction identification is an LSID, and wherein the method further comprises, during the nullifying, marking the LSID of the memory access instruction as completed as if the memory access instruction has executed.

26. The method of claim 21, further comprising, by the processor:
nullifying the memory access instruction by increasing a count of store instructions that have been executed within the first instruction block.

27. The method of claim 26, further comprising:
executing the subsequent memory access instruction when the count of store instructions reaches a predetermined value.

28. The method of claim 26, further comprising:
based on the nullified memory access instruction, committing the first instruction block and execute at least one instruction from at least a second, different instruction block.

29. An apparatus comprising a block-based processor core, the core comprising:
a control circuit configured to cause the core to:
retrieve data indicating execution ordering of a plurality of memory store instructions;
detect a predicated instruction during instruction execution;
determine at least one predicated, first memory store instruction of the plurality of memory store instructions will not execute when a condition of the predicated instruction is satisfied;
generate a nullification instruction, wherein a target field of the nullification instruction identifies a load/store identifier (LSID) indicating a relative ordering for executing the first memory store instruction; and
issue the predicated instruction.

30. The apparatus of claim 29, wherein the target field further comprises a mask and a shift bit, the LSID of the first memory store instruction identified based on the mask and the shift bit.

31. The apparatus of claim 29, wherein the target field of the nullification instruction comprises a mask identifying multiple memory store instructions of the plurality of memory store instructions.

32. The apparatus of claim 31, wherein the control circuit is further configured to:
detect that the condition of the predicated instruction is not satisfied; and
nullify the multiple memory store instructions identified by the nullification instruction.

33. The apparatus of claim 31, wherein the control circuit is further configured to:
execute a subsequent memory access instruction as if the multiple memory store instructions have executed.

* * * * *